April 14, 1959
L. E. DE NEERGAARD
2,882,475
MACHINE TOOL CONTROL SYSTEM
Filed Feb. 16, 1953
4 Sheets-Sheet 1
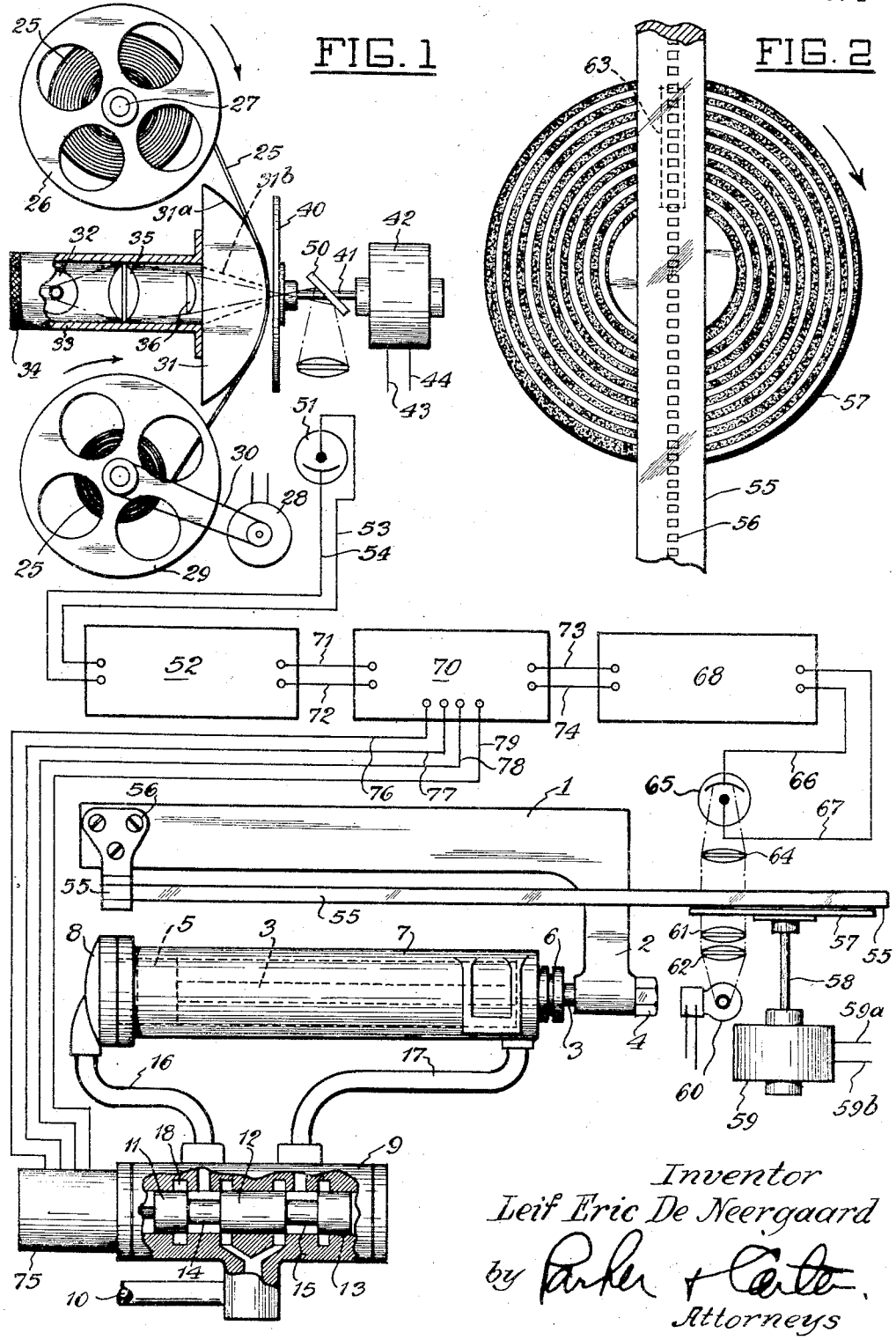
Inventor
Leif Eric De Neergaard
by Parker + Carter
Attorneys

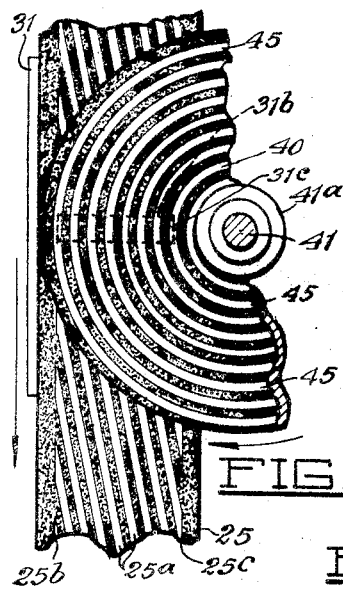
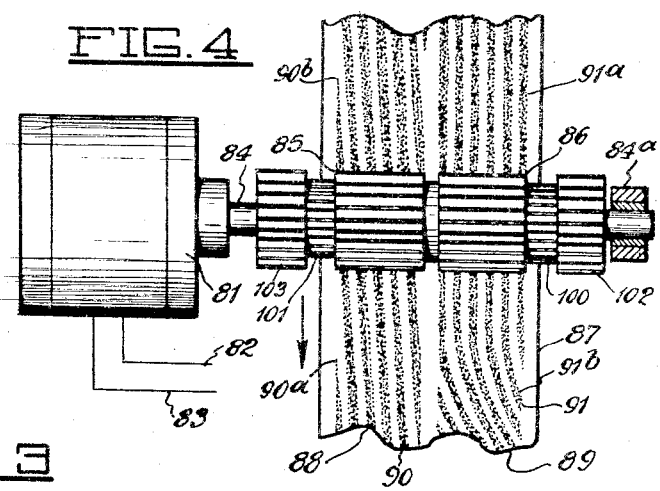
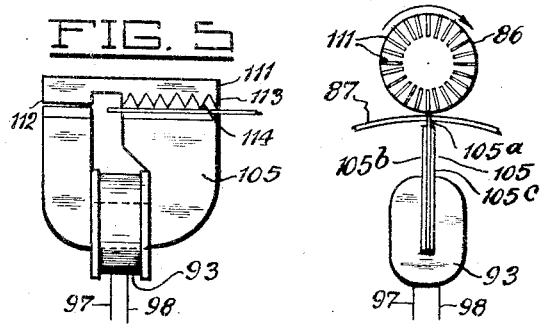
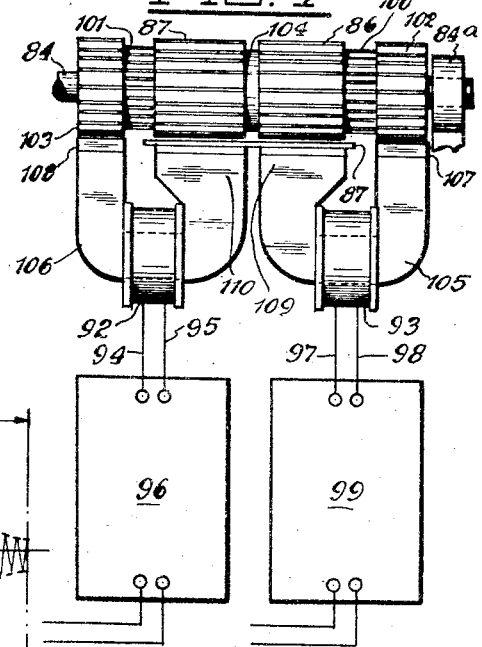
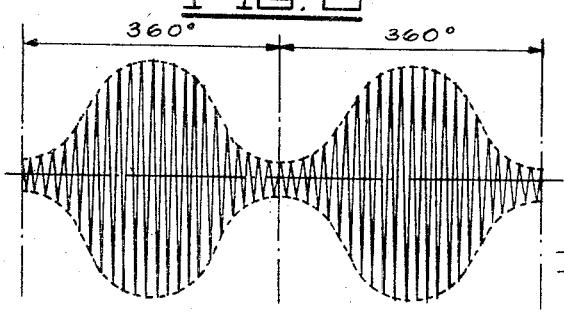
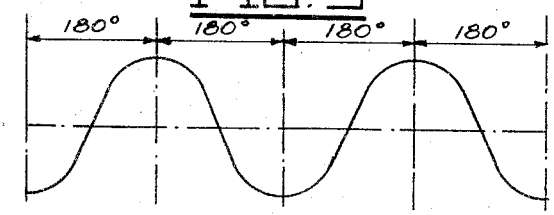

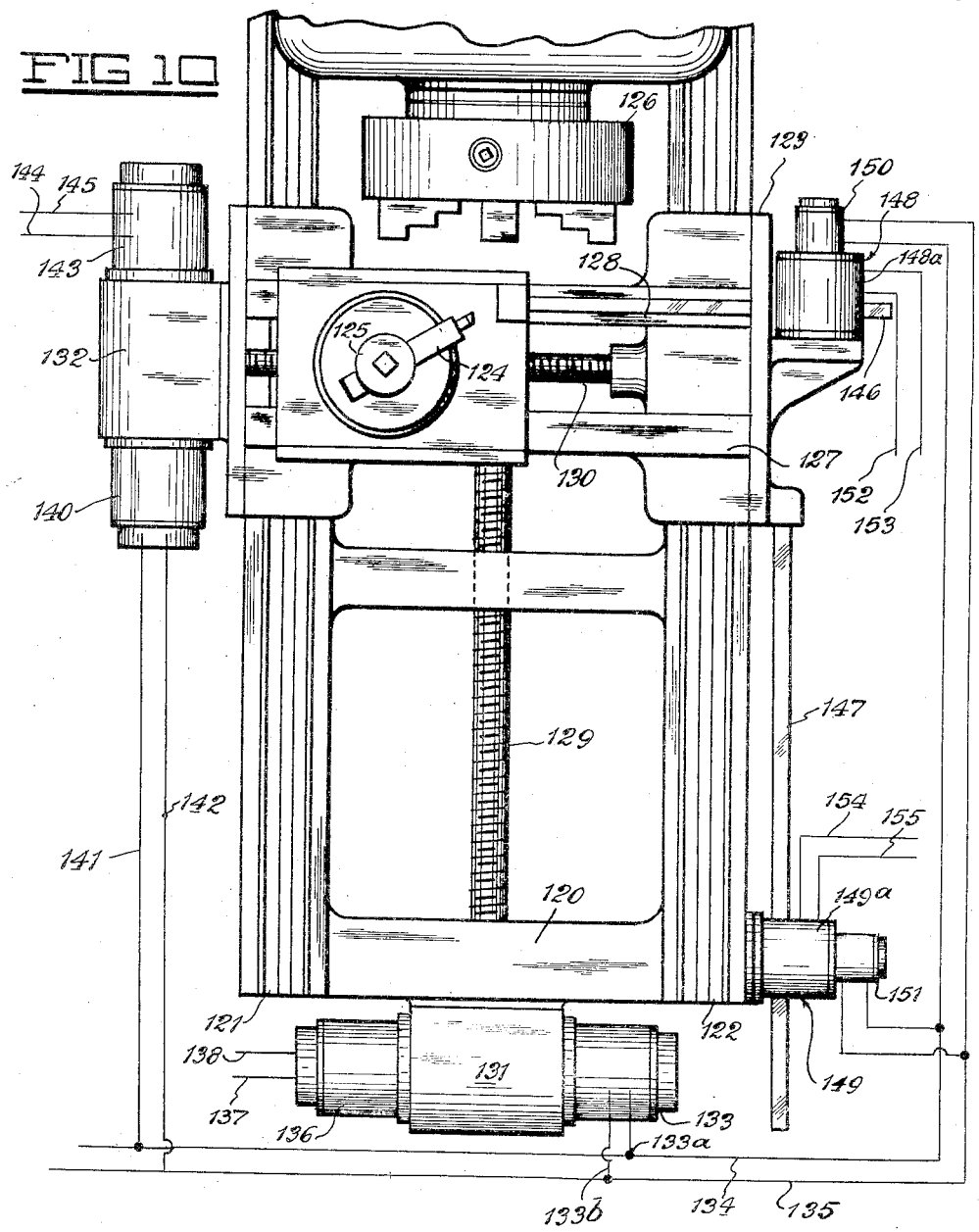

April 14, 1959  L. E. DE NEERGAARD  2,882,475
MACHINE TOOL CONTROL SYSTEM
Filed Feb. 16, 1953
4 Sheets-Sheet 4

TO D.C. MOTOR ← AMP.

Inventor
Leif Eric De Neergaard
by Parker & Carter
Attorneys

United States Patent Office 2,882,475
Patented Apr. 14, 1959

2,882,475
MACHINE TOOL CONTROL SYSTEM

Leif Eric de Neergaard, Madison, Wis., assignor to Frederic W. Olmstead, Washington, D.C., Hans W. Trechsel, Madison, Wis., Deryck A. Gerard, Minneapolis, and John J. Kojis, St. Louis Park, Minn., Norman S. Parker, Evanston, and Malcolm S. Bradway, Chicago, Ill., and said de Neergaard, as trustees; The Northern Trust Company, executor of said de Neergaard, deceased Application February 16, 1953, Serial No. 337,084

56 Claims. (Cl. 318—162)

This invention relates to automatic controls and more particularly to that type of closed cycle position regulating systems adapted to continuously control the linear or angular displacements of a movable member. By the use of the invention it is possible to control the linear displacements of carriages, slides and tables of such machine tools as lathes, grinders, routers, milling machines, die sinkers and the like. Or the rate and direction of arcuate movement of rotatable fabricating machine elements such as dividing heads and radial carriages can be continuously controlled if desired by the use of the methods and means herein disclosed.

Systems presently used to automatically control desired spatial displacement of machine tool elements parallel to one or more axes lying in an orthogonal system can be divided generally into two groups. The first group is tracer control of machine tools such as a copying lathe where a tracer follows the configuration or profile of a template or cam. This configuration can be said to serve as storage of the desired displacement intelligence or data. If three dimensional control is used a tracer is caused to move over the surfaces of a three dimensional model. By the use of this system successive cuts with finite displacement between cuts can be controlled to produce such shapes as a forging or forming die. A signal which is responsive to the movement of the tracer controls the tool or the work.

The second group of present day automatic machine tool controls utilize some species of tape or film upon which certain types of displacement data are stored or impressed by punched holes, magnetized impressions or photographed images such as dots, dashes or patterns similar to sound tracks on motion picture type films. In the preparation of a two dimensional control the outline of a two dimensional cam or template can be translated into certain desired forms of signal which are impressed on the tape, drum or other control element in one of the manners described. Similarly the surfaces of a three dimensional body can be traced in a step by step manner, translated into certain signals and recorded on a control member by either mechanical, magnetic or photographic means. Certain sensing devices, during the control member's "play back" translate the control data impressed thereon into signals which are used to control various types of servo-mechanisms which in turn cause one or more machine tool elements to be displaced in a preselected manner.

In machine tool controls using digital data in recorded form such as perforations in a record, translation of such stored information into signals capable of controlling the movement of one or more tool-to-work or work-to-tool members of a fabricating tool is generally elaborate and complex. Many electrical contacts, relays, sliprings and brushes must be used. These elements are always a potential source of trouble due to pitting, wear and the presence of dust or other foreign particles. The highly involved electronic circuits necessary incorporate hundreds of electronic tubes. Thus the reliability of the system cannot be great since complex electronic circuits using many tubes are highly delicate. The whole device can become inoperative with the failure of a single element. Such involved circuits require large storage space which means that in many instances due to lack of floor space the control cabinets must be located quite some distance from the machine tool being controlled. Furthermore the preparation of the control tape of a digital system is highly involved and requires the services of a personnel highly skilled in geometry, the use of trigonometric tables, shop practice and engineering. Thus employment of the average machinist in this essential step is impossible. Another grave disadvantage of this type of control is the fact that its cost, running into many thousands of dollars makes its use in any commercial machine shop out of the question. Such systems are therefore in their present form quite impractical.

The other control systems which use a recorded datum signal such as a constant frequency signal and a recorded variable signal such as a variable frequency signal which after reproduction and comparison are used to control the movement of a machine tool element have many serious disadvantages.

Possibly the greatest deficiency of such systems is a complete loss of control of a machine tool during such instants that the control tape is run below a certain footage per minute or is stopped. If a cutting tool on a fabricating machine being controlled by such a system breaks it is imperative that the machine be stopped instantly to prevent serious damage to either the work in process or to the machine itself. Since the movement of the machine elements are under complete control of the signals reproduced from the tape it is obvious that once the record stops, control of the elements and their position is lost. If the record stops, the inertia of the system will move the controlled element past its desired position and since the control signal is lost, the error cannot be corrected by the system. These systems incorporate orthodox magnetic pickups and also use conventional magnetic recording systems for the signals. A recorded frequency pattern which is continuously impressed along a narrow area extending on a control tape has a series of extremely minute successive areas which may be magnetized from point to point at opposite magnetic polarity and at different flux densities. During those instants of pick-up or reproduction the polepieces of an orthodox magnetic pick-up must "read" on "scan" these successive areas at a rate sufficiently great to allow the rate of change of magnetic flux threading the magnetic structure of the pickup to be large enough to build up a pulsating E.M.F. of sufficient magnitude in the windings of the pick up coil. Therefore since conventional magnetic reproducing systems use stationary magnetic pickups it will be seen that in order for the pole pieces of such a device to effectively scan the magnetic tape it is essential that this control member be displaced above a minimum rate at all times that the system is in operation.

Closed loop servo systems using recorded frequencies as the control media have grave limitations other than loss of control when the recording tape or other type of control member is stopped or operated below a certain critical velocity. One of these limitations is that the minimum rate of advance of the magnetized tape in many such systems is in the neighborhood or not less than 4″ per second. Thus a simple fabricating cycle consuming only three minutes would require 720 inches or 60 feet of control record. While the cost of such a length of tape is moderate its storage on a machine tool becomes a serious problem.

Another disadvantage of this type of control is that the tape must be displaced above the minimum rate attended to even during dwell time on the machine tool. Some dwell operations such as indexing have only to be initiated by a reproduced magnetically impressed signal. The rest of the operation which may take upwards to a minute or more requires no control signals from the system. Although the controlled elements may be in a static condition when such an operation is taking place the tape during this interval must still be displaced at its minimum rate to avoid loss of control of the machine tool.

The recording and play back of a datum or reference signal entails the use of considerable elaborate and expensive electronic equipment. The instant invention as will be later brought out completely eliminates the use of such a recorded signal to materially reduce the cost, complexity and unreliability of an automatic control.

One object realized by the use of my invention is the provision of a closed cycle position regulating system which requires the generation of only two signals to continuously affect the rate, direction, and magnitude of displacement of a slidable machine tool element or other controlled member.

Another object of this invention is the provision of a system capable of controlling the displacements of a tool-to-work or work-to-tool member without the necessity of generating a base signal.

Yet another useful result subserved by the use of the instant invention is the provision of methods and means whereby a control element upon which displacement intelligence is recorded can be stopped at any instant without any loss of control of an element being motivated by the system.

Another highly valuable object obtained by the use of the invention is the provision of an automatic machine tool control which is capable of continuously controlling the displacements of one or more slidable or rotatable machine tool elements without any error whatsoever in the system due to back lash.

Another object is to provide an extremely simple closed cycle regulating system which uses only two sensing elements having two moving parts and which can, under certain circumstances, be reduced to a single rotated assembly.

Still another important result obtained by the use of this invention is the provision of a control having a control member upon which displacement intelligence is impressed which, as far as accuracy is concerned, is completely insensitive to variations in the speed of displacement of the control member from instant to instant.

Yet another object of the invention is to provide a closed cycle position regulating system capable of continuously controlling the rate, magnitude, and direction of linear or angular displacement of one or more fabricating tool elements which has an extremely high resolution. Thus the movement of a slidable machine tool element, such as a lathe carriage, for instance, through a distance of only .0001" can instantly be detected and translated into a control signal to increase or decrease the carriage's displacement in conformity with the displacement intelligence.

Yet another very valuable advantage obtained by the use of this invention is the provision of a closed cycle position regulating system which in a one element control makes use of a very simple electronic system which utilizes a minimum of tubes or transistors. Furthermore, the circuits used by the device can, in many instances, incorporate magnetic amplification and summing circuits to eliminate high vacuum tubes completely to correspondingly increase the reliability of the control system to a very high degree.

Another valuable result obtained by the use of the invention is the provision of an automatic machine tool control which is capable of completely operating a plurality of separated similar fabricating machines from one single control film or tape upon which the displacement intelligence controlling the machines has been recorded.

Another object of the invention, which is of utmost importance, is the provision of a closed cycle position regulating system which is extremely compact. Thus, as an example, the control record, amplifiers and summing circuits of a copying lathe can be enclosed in a cabinet occupying a relative small space.

Another important result subserved by the use of my invention is the provision of an automatic machine tool control which due to its great simplicity can be made at an extremely low cost which in turn makes its use in the automatic control of relatively simple machine tools entirely sound and practical from an economic standpoint.

Another result obtained by the use of the instant invention is the furnishing of an automatic control system for the slidable or arcuately moved work members of fabricating devices whose control record and amplifying circuits can be enclosed in a cabinet located ten or a hundred feet away from the fabricating tool being controlled by the system.

Another object of the invention is to provide a system by whose use the speed of the cycle, the rate of movement of one or more of the linearly or rotatably displaced elements of a machine tool can, by changing the linear velocity of control record upon which displacement data is recorded, be varied over an extremely wide range. The rate of displacement of the control tape can be either manually adjusted or can be automatically varied in response to the resistance encountered by a material removing tool as it cuts into the article of manufacture being machined. Thus, as an example, the magnitude of the wattage input of an electric motor driving the spindle of a lathe being controlled by the invention can, by a simple thyratron circuit, be used to control the instantaneous rate of rotation of a small, direct-current motor used to continuously feed the control tape to certain sensing elements. With such a circuit the rate of linear displacement of the tape can be immediately decreased if the lathe tool is removing an excessive amount of stock since the wattage consumed by the lathe spindle would increase in proportion to the increased tool resistance. Conversely, if the lathe tool, at certain instants, was removing less than a predetermined amount of stock per unit time, the electrical power consumption of the lathe spindle motor would be reduced by a corresponding amount to cause the speed of the small direct current tape drive motor to automatically increase. In turn, the control tape would be instantly displaced at a higher linear velocity to cause the lathe tool to be advanced into the work at a higher rate. Thus the system is highly flexible and can accommodate itself to various conditions encountered during the control cycle.

Another important result obtained by the use of the herein disclosed invention is the provision of a control system by whose use the direction of angular or straight-line displacement of fabricating tool work members can be reversed at will by the simple expedient of merely reversing the direction of movement of the control record upon which the tool's displacement intelligence is impressed.

Yet another highly important object supplied by my invention is the provision of methods and means by whose use an automatic machine tool control can be built in which time lag is reduced to substantially the vanishing point.

A further very important object of the invention is to provide a closed cycle position regulating system whose high degree of accuracy in controlling the rate, magnitude, and direction of displacement of one or more machine tool work-members is unimpaired by the wear of lead screws, their coacting nuts, racks, pinions, gears, or any other power elements whose rotation actually control the movement of machine tool elements.

Another object of great importance obtained by the use of this invention is the provision of a servo-control whose construction makes unnecessary the use of switches, contacts, relays, slip-rings, brushes, commutators or any other type of mechanical device used to make and break an electrical circuit in the control network. The elimination of these elements is highly desirable since a very large percentage of failure of electrical systems can be attributed directly to these contact making devices.

Yet another object of the invention is to furnish an automatic machine tool control utilizing a control tape or member upon which the displacement data is magnetically or otherwise recorded which is continuously sensed by a rotated pickup which at no time has any physical contact with the control record it is scanning.

Another highly important object obtained by the use of the herein disclosed invention is the provision of a displacement sensing device which continuously measures the position of a machine tool work member being controlled by the invention and instantaneously translates any displacement of the work member into a proportionate signal even though the displacement is a fraction of .0001″.

Another valuable result brought about by the use of the invention is the provision of a device capable of sensing the position of a machine tool element from instant to instant although there is no physical contact whatsoever between the sensing device and the tool element. In this manner wear of the sensing device is entirely eliminated to ensure absolute reliability of operation during the life of the control system.

Another object of this invention is to provide a novel method and apparatus for accurately producing a variable cycle signal from a control record which may take the form of a thin, elongated ribbon-like tape.

Another object of this invention is to provide a novel and accurate method for controlling the magnitude of a physical quantity such as speed, voltage, temperature, pressure and the like.

Another object of this invention is to provide a method for correcting an erroneous control signal generated from a control record.

Another valuable result obtained by the use of this invention is the provision of a closed loop position regulating system which is universally adaptable to control electrical, pneumatic or hydraulic units which supply the power necessary to move such work-members of machine tools as carriages, rotary tables, indexing heads, slides, platens, spindles, etcetera. Thus the invention disclosed is capable of controlling electrical motors whose rotation transmitted to a lead screw is translated into the straight line displacement of a carriage or slide; an hydraulic or air motor similarly driving a lead screw; an air cylinder whose piston imparts longitudinal displacement to a slidable work member, an hydraulic ram also displacing a slide, table, or carriage in a linear manner and so forth.

Yet another important result obtained by the use of the invention is the provision of a displacement intelligence storage member capable of controlling a lengthy and complex fabricating cycle of a machine tool which is so small and light in weight that it can be airmailed a distance of several thousand miles for, in many instances, less than one dollar. As an example, a fifty foot length of a member in the form of magnetized steel tape capable of controlling a complex work cycle of a six tool turret lathe can be packed in a container some 3″ x 3′ x 1½″ weighing not more than 12 or 14 ounces. This tape, it should be pointed out, may supplant four of five steel cams weighing from ten to possibly a hundred or more pounds apiece.

This application is a continuation in part of my issued United States Patent No. 2,628,539, issued February 17, 1953.

Other important objects and results obtained by the use of the invention will become manifest after study and perusal of the appended description and figures illustrating different species of the invention in which:

Figure 1 illustrates in a schematic manner one species of the invention utilizing light flux as the sensing media which is controlled by means of photographed impressions impressed on a control member consisting of a motion picture type of film.

Figure 2 illustrates a certain type of cyclic signal generator used in the system illustrated by Figure 1.

Figure 3 illustrates a signal generator capable of translating certain displacements photographically impressed on a control member into control signals adapted to control the system illustrated in Figure 1.

Figure 4 illustrates in plan a rotary magnetic pickup which translates certain displacements of magnetic traces impressed on a magnetized control member into certain control signals which are used to control a two dimensional closed loop position regulating system depicted in Figures 10 and 11.

Figure 5 illustrates a certain species of magnetic sensing device used in the system illustrated by Figures 10 and 11.

Figure 6 is a side elevation of the elements illustrated in Figure 5.

Figure 7 is a sensing assembly of certain elements shown in plan in Figure 4.

Figure 8 is a graphical representation of a signal sensed by a magnetic pick up illustrated by Figures 3, 5, 6, 7 and 11.

Figure 9 depicts a signal form resulting from the rectification of the signal graphically illustrated by Figure 8.

Figure 10 is taken in plan and illustrates the carriage and slide of an engine lathe controlled by one species of the invention.

Figure 11:
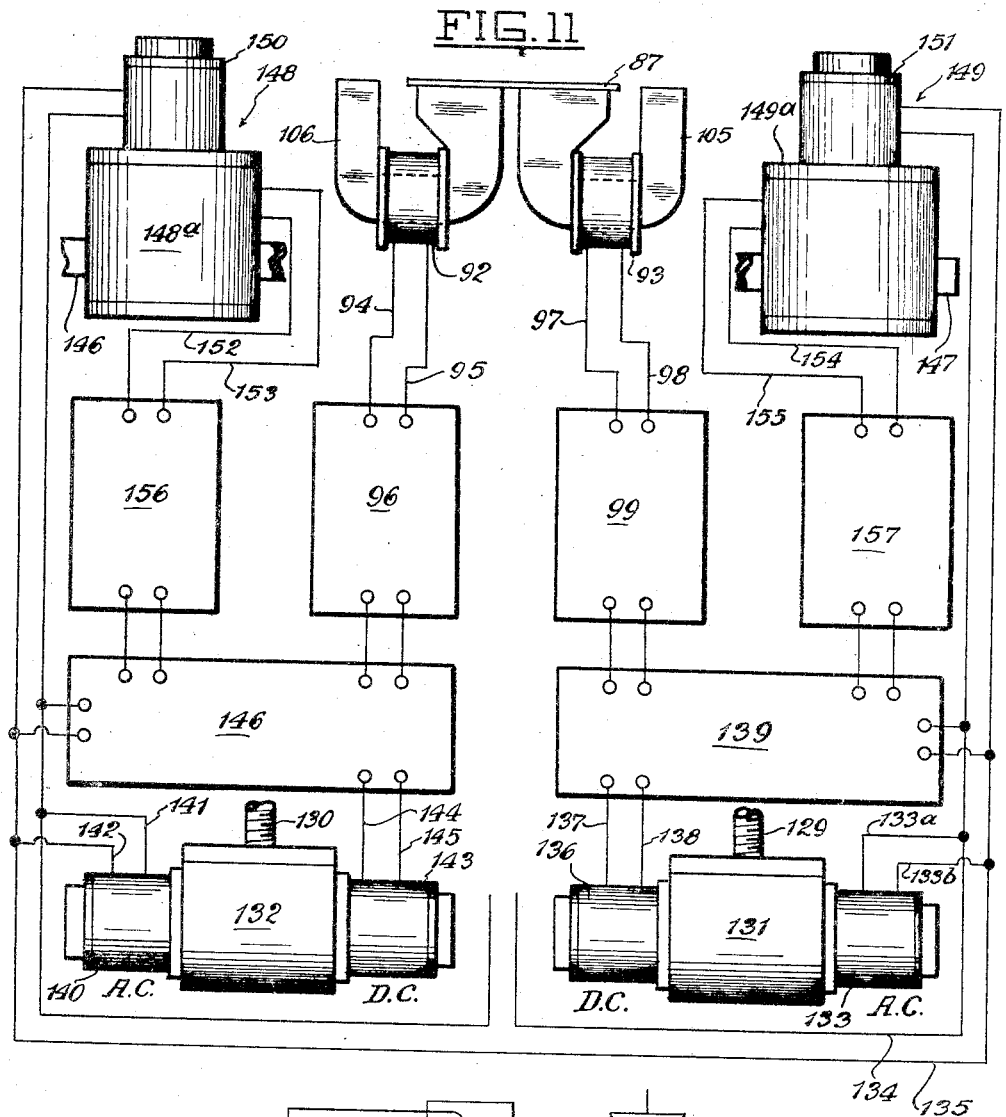
Figure 11 is a schematic illustration of the system utilized in controlling the slidable members of the lathe shown in Figure 10.

Figure 1 depicts a single closed loop position regulating system adapted to control the rate, magnitude and direction of linear displacement of a machine tool carriage or movable member from instant to instant. The carriage 1 will be considered to be moved horizontally as viewed in this figure. It will be understood that although not shown the carirage is supported by ways provided along the upper surfaces of a lathe bed (not shown). A dependent arm 2 located at the right hand end of the carriage 1 is connected integrally to the right hand end of piston-rod 3 by means of the nut 4. The other end of piston-rod 3 is fastened integral to piston 5 which in Figure 1 is shown to be approximately at the end of its up-stroke. Although not shown it will be understood that the piston is provided with conventional piston rings on cup leathers to preclude the leakage of the high pressure hydraulic fluid used to motivate the hydraulic system. A stuffing-box 6 of orthodox design serves to effectively seal the joint where the slidable piston rod 3 emerges from the cylinder 7. The left hand end of cylinder 7 is effectively closed by means of a cylinder head 8 of conventional design.

Pressurized oil is delivered to a hydraulic valve 9 by means of the delivery line 10 from a hydraulic pump (not shown). The valve 9 may be of the conventional 4-way design shown although a valve of the type described in an A.S.M.E. Paper No. 51–A52 is preferable due to the very small amount of energy required to stroke or position the valve piston. Valve 9 controls movement of motor 7.

The movable element of the valve consists of three cylindrical spools 11, 12 and 13 separated by stems 14 and 15. Piston 5 is motivated by selectively delivering fluid through conduits 16 and 17. The movable element is indicated to be in a neutral position at which time no pressurized oil can flow from a hydraulic pump (not shown) through the delivery conduit 10 to the power cylinder 7. At such times, the piston and carriage 1 are stationary. Displacement of spool 12 to the left admits fluid to cylinder 7 through conduit 17 and exhausts fluid through conduit 16. Displacement to the right reverses these functions. An electrical torque motor (not shown) is enclosed in a housing 75 on the end of the valve. Certain signals are impressed on the control coils of said torque motor. The motor serves to displace the spool 12 in either of two directions.

A film drive and storage system is illustrated in the upper left hand corner of Figure 1. A length of motion picture type film or record 25 upon which the initiating controls for the overall system are photographically impressed is stored on the upper reel 26 which is rotatably supported by a suitable fixed shaft 27. Energization of a small motor 28 causes rotation of a driving reel 29 through a drive belt 30. The film 25 is thus adapted for continuous movement downwardly from storage reel 26 and to driving reel 29. A stationary saddle 31 is located between the two reels 26 and 29. The saddle is preferably made of bronze and as may be seen from Figure 1 has a curved surface 31a which supports film 25 as it is drawn downward from the storage reel to the drive reel. The surface 31a is preferably ground, chrome plated and highly polished to afford a practically frictionless support to the film. It should be understood that the width of saddle 31 is greater than the width of the film 25 which for purposes of description will be taken to be exact by 1.000". Therefore, the film is supported across its full width by surface 31a of saddle 31. A light source comprised of filament lamp 32, lamp housing 33, end cap 34, lens 35 and plano cylindrical lens 36 is illustrated in Figure 1. The lamp housing 33 is rigidly fastened to saddle 31 as shown and effectively supports the lamp 32 and lenses 35 and 36. The filament of lamp 32 is supplied preferably with direct-current from either a small generator, power pack or battery (not shown). A tapered slot 31b is machined through saddle 31 to allow light flux from the optical system to be projected through an area 31c of the film 25 (Figure 3). The light source is used to adequately and uniformly illuminate the area 31c, Figure 3, whose dimensions for purposes of description will be taken to be exact by .150" x .800". Record 25 and light source 32 are part of a primary signal generator.

A scanning member in the form of a primary flux interrupter 40 comprised of a circular glass disk, upon one of whose transparent surfaces an opaque multiple convolution Archimedes spiral is formed, is mounted integrally and concentrically to a rotor shaft 41 of a motor 42, which may be supplied for purposes of illustration with 60-cycle alternating current by the electrical leads 43 and 44 as will be seen best in Figure 1.

Figure 3 illustrates certain details of the primary signal flux interrupter 40 and film 25. The width of the film as stated will be considered to be 1.00". Eight transparent traces 25a are photographically impressed along the length of the film within a control lane or channel of a predetermined width as at 25b and 25c. The width of the transparent traces 25a will be taken for purposes of description to be exactly .050 inch transverse to the axis of the film. Their pitch similarly measured will be taken to be precisely .1000". The primary flux interrupter 40 consists as stated of a circular disk of high quality optical glass. By photographic means a very accurately generated single pitch multiple convolution Archimedes spiral 45 is impressed on that surface of the glass disk immediately next to the film. The Archimedes spiral 45a is opaque as indicated in Figure 3 which partially depicts the primary flux interrupter 40. The width of each opaque convolution 45 is precisely .0500" when measured along a line extending radially from the axis of rotation of the glass disk upon which the Archimedes spiral is impressed. The width of the transparent convolutions 45 which separate the opaque convolutions 45a is also .050 inch. The pitch of the transparent spirals when similarly measured is exact by .1000". The transparent areas form sensing members or portions which transmit light flux. It will be understood that material opaque to light such as chrome or aluminum can be coated on the surface of the glass disk by evaporation in lieu of photographic emulsion to provide a highly accurate Archimedes spiral. It should also be understood that the area of the control film 25 not occupied by the transparent lanes 25a should by proper development be as opaque as possible.

Motor 42, for purposes of illustration will be assumed to be of 2-pole synchronous construction whose rotor shaft will be continuously revolved 3,600 r.p.m. or 60 r.p.s. when the stator windings are excited with 60-cycle alternating current. A front-surface mirror 50 is rigidly supported in such a manner that any light flux from lamp 32 which is projected through the slit opening 31c and thence thru the film 25 and flux interrupter is deflected at 90° to impinge on the cathode surface of a photo-tube 51. The photo-tube may be of the high vacuum type although a gas filled tube can be more efficiently used due to its higher output per lumen excitation. Figure 1 illustrates that the output of photo-tube 51 is conducted to an electronic amplifier 52 through the insulated and shielded leads 53 and 54.

The left hand end of a meter bar 55 (as viewed in Figure 1) is rigidly supported integral to the machine tool carriage 1 by means of a dependent bracket 56. In order to simplify the illustration and description of the invention the meter bar 55 will be taken to be made of high quality optical glass 1" wide, ⅜" thick and whose length is governed by the magnitude of desired longitudinal travel of the machine tool carriage 1 as will later be explained.

Meter bar 55 is provided with a series of equidistantly spaced light transmitting apertures 56. It will be assumed that each of the apertures 56 is exactly .05 inch in width measured parallel to the longitudinal axis of the meter bar 55. The spaces between the apertures will be considered to be .05 inch in width resulting in a .100 inch pitch of the apertures. An Archimedean spiral is generated on one face of a glass disc-shaped circular member 57 which is positioned on one side of the meter bar 55. Disc 57 is concentrically mounted upon the shaft 58 of a synchronous motor 59 energized through leads 59a and 59b and which is adapted to be driven at 60 revolutions per second, or the same speed of rotation of the motor 42. Disc 57 is substantially identical to the disc 40 cooperating with the film 25. The spiral is so formed as to present alternate light-transmissive and non-light-transmissive areas by means of its convolutions generated about the axis of shaft 58. The width of these areas corresponds generally to the width of the apertures 56 formed on the meter bar 55. Thus, if the meter bar 55 is held stationary and the disc 57 is rotated at 60 revolutions per second the apertures on the meter bar will be alternately opened and closed to the transmission of light 60 times per second.

A light source 60 is positioned on one side of the meter bar 55 in a manner such as to project light through the disc 57 and meter bar 55. Lenses 61 and 62 serve to focus and direct the light through the transparent convolutions of the Archimedean spiral and apertures in the meter bar 55 and through a generally confined area of the meter bar, as is indicated by the dotted line shown in Figure 1, and at 63 in Figure 2. A lens 64 is positioned in the line of the light passing through the spiral and apertures in the meter bar and focuses the light on a photocell 65. The photocell is electrically connected through suitable leads 66 and 67 to an amplifier 68. Thus, with the meter bar stationary as the motor 59 rotates at 60 revolutions per second, the light passing through the apertures in the meter bar 55 will be interrupted by the opaque convolutions on the disc member 57, 60 times per second. Accordingly, the light reaching the photocell 65 will be interrupted 60 times per second and will produce a 60 cycle per second signal or supply to the amplifier 68.

Since the amplifiers 52 and 68 may take any one of several known forms, it is not thought necessary to illustrate and describe them in detail, and for this reason they are shown in a diagrammatic form.

The record 25, member 40, light source 32, and photocell 51 constitute a primary signal generator. The meter bar 55, disc 57, light source 60 and photocell 65 constitute a secondary signal generator. Each of these generators produces a cyclic signal, or a signal whose amplitude varies periodically in a regular manner. According to my invention, the primary signal is displaced along a time axis at a rate and in a direction related to the rate and direction of desired movement of a machine tool or movable member, such as is represented by the work table 1, shown in Figure 1. The secondary signal is displaced along a time axis in a direction and at a rate proportional to the actual movement of the member controlled, which is represented by the work table 1, shown in Figure 1.

I relate the desired position of a member such as the work table 1 to a predetermined displacement of the signal generated by the primary signal generator along a time axis. In carrying out this principle, I cause a displacement to be imparted to the generally parallel traces with respect to the direction of movement of the record shown in Figure 3 may be effected in a manner shown and described by me in my co-pending application Serial No. 336,768, filed on February 13, 1953.

Starting first with the assumption that the work table or controlled member 1 is desired to be held in a stationary position, the traces 25a formed on the control-record 25 are given no displacement with respect to the edge of the record and the traces are accordingly generally parallel to the edge of the record. As long as the traces are generally parallel to the edge of the record and the record is advanced at any pre-selected rate of speed, the signal generated and supplied to the amplifier 52 will fluctuate 60 times per second if the motor 42 is driven at the rate of 60 revolutions per second. It it is desired to move the member 1 in one direction or to the left as shown in Figure 1, the traces 25a are displaced with respect to the edge of the record towards the left as will be shown in Figure 3. The displacement of these traces with respect to the edge of the record per unit time corresponds to the desired displacement of the work table or controlled-member 1 per unit time. A displacement of one trace per second results in an attendant 360 degree electrical phase displacement along a time axis in the embodiment shown in Figures 1, 2 and 3. A relative displacement of one trace for any unit of time results in a 360 electrical degree phase shift for that unit of time.

Displacement of the meter bar 55 through a distance of .100 inch, which is equal to one trace on the control record and the pitch of the apertures 56 also results in a 360 degree electrical phase shift along a time axis. A smaller displacement of the traces on the control record gives a proportionally smaller phase displacement per second, and a smaller displacement of the meter bar 55 gives a proportionally smaller phase displacement of the secondary signal.

According to the principles of my invention, the secondary signal follows the primary signal when the primary signal is displaced along a time axis.

The phase relations of the primary signal and secondary signal are compared and the member 1 under control is moved by the fluid motor 7 in accordance with the phase relationship or differential between the two signals derived. Any one of a number of electronic circuits may be employed to continuously compare the phase relations of the primary signal and secondary signal and suitably actuate the balance valve 9 by changing the magnitudes of direct current signals impressed on the windings of a torque motor 75 used in stroking the valve spools. Since the phase comparing component in itself forms no part of the present invention, it is represented more or less diagrammatically at 70. The amplified A.C. primary signal is led through suitable leads 71 and 72 from the amplifier 52 to the phase comparing component 70 and the amplified secondary A.C. signal is led from the amplifier 68 through leads 73 and 74 to the phase comparing component 70.

Phase comparing component circuits taking the general form of those illustrated on page 352 and described on page 351 of the publication "Radar System Fundamentals," Navships 900,017 published by the Bureau of Ships of the United States Navy Department, or those shown and described in Chapter 12 of "Principles of Radar" by the Massachusetts Institute of Technology radar staff may be employed to compare the primary A.C. signal and the secondary A.C. signal and deliver D.C. output signals whose magnitudes differentially respond to the phase relationship of these two signals.

Generally speaking, the phase comparing system 70, shown in Fig. 1, is adapted to continuously control the magnitude of two direct currents impressed on the differential windings of the torque motor 75. It will be understood that one direct current signal is led to one of the differential windings of the torque motor 75 through leads 76 and 77 while the other D.C. signal is conducted to the other differential winding of the torque motor by leads 78 and 79.

For purposes of description it will be assumed that when the magnitudes of both direct currents are equal there is zero phase displacement of the secondary signal in relation to the primary signal. At such instants the slidable piston of the balance valve 9 will be maintained in its neutral position, thus preventing flow of hydraulic fluid to either side of the hydraulic motor 7. However, a small leading phase displacement of the secondary signal in relation to the primary signal will, for instance, cause a signal of greater magnitude to flow through the conductors 76 and 77 while reducing the magnitude of the other D.C. signal by a proportionate amount. This differential excitation of the differential coils of the torque motor will cause the piston of the balance valve to be displaced by a small amount in a certain direction. A greater phase shift in a leading direction of the secondary signal relative to the primary signal will cause a proportionately greater movement of the valve piston in the same direction since the magnitude of the signal impressed on the differential coil through leads 76 and 77 will be still further increased while the D.C. signal to the other differential coil will be further decreased. Obviously an opposite phase displacement between the primary and secondary signals will cause the valve piston to be oppositely displaced by amounts varying in exact proportion to the magnitude of the phase relationship of the two alternating current signals from instant to instant. Thus it will be seen that the movement of the piston 5 and, accordingly, the displacement of the carriage 1 is responsive to the phase relations of the secondary signal relative to the primary signal. Torque motors of various types for this purpose are well-known to the art and a detailed description thereof is believed unnecessary.

I wish it to be understood that there are many equivalent circuits and mechanisms for producing movement of the valve stem in response to the phase relation of the primary signal and secondary signal. I, therefore, wish this description to be taken as illustrative only and not as limiting me to any precise form of phase-comparing component.

Assuming that the traces on the control record are displaced towards the left, as shown in Figure 3, at a rate of one pitch per second and assuming that the record 25 is moved at a linear rate of 5 inches per second, this displacement of the traces dictates a displacement of the work table 1 towards the left at the rate of one pitch, or .100 inch per second. Further, assuming that the sensing or scanning member 40 is rotated at a selected speed, for example, 60 revolutions per second, the convolutions of the spiral will move across the traces on the record in the direction of the arrow indicated at the upper portion of Figure 3, or in the same direction as the displacement of the traces. With the traces moving in the same relative direction as the convolutions of the spiral or flux interrupting surfaces, the number of interruptions per second will be smaller than if the traces were parallel to the edge of the record or direction of movement of the record, and since the traces are displaced at the rate of one trace per second in the same direction as movement of the flux interrupting surfaces across the record, the result will be 59 interruptions of light or cycles per second of the signal received by the photocell 51 and transmitted to the amplifier 52. Since during this interval of time the number of interruptions or cycles has decreased by one, the signal will have been shifted along a time axis by 360 degrees, but during this time interval of one second, the valve member 9 will have been actuated to supply fluid through conduit 15 to move the controlled member 1 towards the left, as dictated by the displacement of the traces. As the primary signal started in its advance across the time axis, the secondary signal was still 60 cycles per second. However, during a fraction of that second, the phase differential developed between the primary signal and the secondary signal was such as to slide the valve member 12 towards the left, as will be seen in Figure 1, and admit fluid through the conduit 15 to the motor 7. And as the member 1 moves towards the left, the meter bar 55 also moves towards the left, or in the same direction as the apparent movement of the convolutions of the flux interrupting surfaces or spiral on member 57, as will be seen in Figure 2. Since the meter bar 55 was moving in the same direction as the convolutions on the spiral, the number of light interruptions per second reaching the photo-cell and accordingly the number of cycles per second of the secondary signal will have been decreased to a point approaching 59 cycles per second. In other words, the secondary signal will have been shifted along a time axis in electrical degrees similar to the movement of the primary signal along a time axis.

Conversely, when the traces shown in Figure 3 are displaced towards the right at a predetermined amount or at a predetermined rate with respect to the rate of speed of the record 25, a number of light interruptions reaching the photocell 51 will be increased over that of the speed of rotation of the member 40 to thus create a phase displacement in the opposite direction. The phase differential between the primary signal and secondary signal is such as to move the valve member 12 towards the right, as seen in Figure 1 and supply fluid through the conduit 16 to the left side of the fluid motor, and move the controlled member or work table 1 towards the right. This in turn results in greater relative movement between the convolutions of the spiral and apertures and the meter bar 55 and an attendant increase in the number of cycles per second of the secondary signal. This results in a phase displacement of the secondary signal along a time axis in a direction opposite to the previous example, or in the same direction as the displacement of the primary signal in this example.

The record may be moved at any given speed over a comparatively wide range and the motors 42 and 59 driving the sensing members 40 and 57 may be operated over a wide range of speeds as long as the motors 42 and 59 operate at the same speed. If desired, both the motor 42 and motor 59 may be supplied with 60 cycle alternating current from any conventional main. As an alternative, the motors 42 and 59 may be dispensed with and the members 40 and 57 mounted on a common shaft such as a flexible shaft for rotation by a single air motor or other suitable prime mover. The speed of the cycle of operations of the work table 1 or controlled member is governed by the speed of movement of the record 25, but at any such speed of the record the position of the work table or controlled member 1 is dictated by the relative displacement of the traces on the control record with respect to their position at any starting point.

Whereas the species of the system shown in Figures 1, 2 and 3 is illustrated and described as having a single control lane or channel on the control record, I wish it to be understood that the control record may be provided with a plurality of control lanes extending side by side throughout the length of the record. In such an instance, each control lane would be provided with a plurality of parallel traces as shown in Figure 3 and the traces would be displaced with respect to the edge of the record in amounts related to the direction of desired movement of the controlled member along one coordinant. If the controlled member 1 or work table 1 is desired to have a plurality of coordinants of movement, an additional control lane would be provided on the control record for each coordinant and a separate lane-sensing member, hydraulic motor or actuating mechanism, and secondary signal generator together with the phase-comparing circuit would be provided for each coordinant of movement. For purposes of simplicity, the system shown in Figures 1 thru 3, inclusive, is shown as providing for a single control lane for one coordinant of movement which is linear movement in this example.

Figures 4 thru 9 inclusive show another species of primary signal generator. In this species, the control record is provided with a plurality of control lanes. One lane, for example, controls longitudinal movement of the member and the other lane controls lateral movement of the member.

A motor which may be a species of synchronous motor is designated generally at 81. The motor may be supplied with current through leads 82 and 83. Motor 81 has a shaft 84 carrying a pair of cylindrical scanning members designated generally at 85 and 86. A bearing 84a supports one end of shaft 84. A control record which, in this instance, may be made from stainless steel or other material suitable for magnetic recording is designated at 87. The record 87 has a control lane 88 adapted to control lateral displacements of a controlled member for example, and a control lane 89 adapted to control longitudinal displacements of a controlled member. Each control lane is provided with a plurality of generally parallel traces thereon, designated generally at 90 and 91. These traces are magnetized so as to transmit magnetic flux or lines of force. The traces may be impressed upon the control record in the manner described in my co-pending application Serial No. 336,768, filed in the United States Patent Office on February 13, 1953. As in the previous species, the traces of the controlled record are displaced with respect to the edge of the record proportional to the desired movement or desired position of the member controlled from instant to instant. In this species of the system, the scanning members 85 and 86 are adapted, through movement of portions thereof transversely to the record, to induce primary signals in a pair of induction coils 92 and 93, there being one such coil for each scanning device and for each control lane on the record 87. Induction coil 92 is adapted to transmit a cyclicly varying signal through leads 94 and 95 to an amplifier 96. Similarly, induction coil 93 is adapted to supply a cyclicly varying primary signal through suitable leads 97 and 98 to an amplifier 99. The details of the amplifiers 96 and 99 in themselves do not form part of the instant invention since amplifiers are well known to the electronic art and, therefore, they are illustrated diagrammatically in Figure 7.

Each of the scanning members 85 and 86 are preferably formed of bronze or other similar material having a high resistance to the passage of magnetic flux. Each scanning member 86 and 85 is of a length such as to extend over the width of the control lanes on the record 87. The body of each scanning member is provided with a reduced portion extending laterally from the control record as at 100 and 101 and each body portion is generally enlarged as at 102 and 103. In the particular form of scanning members shown, the members 86 and 85 are joined by a reduced intermediate portion 104. A generally U-shaped magnetic circuit establishing member 105 formed of Mumetal or its equivalent is provided for the scanning member 86 and a U-shaped magnetic circuit establishing member 106 formed of Mumetal is provided for the scanning member 87. The bight portions of each of these Mumetal members pass through their associated induction coils 92 or 93. Each member has one leg portion terminating in a reading lip disposed adjacent to the enlarged portions 103 and 102 of the scanning members 86 and 85, as at 107 and 108. The other leg of each member is disposed beneath the record 87, as at 109 and 110. These members may be made up of a series of Mumetal laminations. As will be seen in Figure 6, I preferably employ a stack of three such laminations with an intermediate lamination 105a disposed immediately beneath the record while the outside laminations 105b and 105c are spaced a small distance from the surface of the record. It should be noted that the scanning portions disposed adjacent the record are spaced a very slight distance from the controlling surface of the record and the enlarged portions 102 and 103 are spaced a very, very slight distance from the end portions or reading lips 107 and 108, which in this instance are formed of the center or intermediate lamination. Essentially the laminations are formed of a metal so as to readily pick up and transmit magnetic flux or lines of force.

Each of the scanning members is provided with a series of Mumetal laminations 111 inserted throughout the length of the scanning members and disposed about the periphery of the scanning members. In the particular example shown in Figure 6 there are 24 laminations 111 disposed in the body of the scanning member. Each lamination has a length such as to extend over the reading lip or end portion of the member 105 while extending over the width of the control lane on the record at its other end, as will be seen in Figure 5. These laminations are sensitive to magnetic flux and form sensing members adapted to sense and transmit magnetic flux from the traces. In its outer dimensions, each lamination corresponds generally to the configuration of its associated scanning member. It includes a portion 112 having a width generally equal to the width of the reading lip and a portion 113 having a width generally equal to the width of the control lane. Thus, when a lamination 111 is disposed directly over the magnetized traces on the control record 87 a magnetic circuit will be established from the traces, through the lamination 111 through the reading lip member 105 or 106, as the case may be, and back to the record, thus inductively generating a signal in the coil associated with the member.

The portion of each lamination 113 which is disposed over the control lane is provided with a series of spaced teeth 114 whose spacing corresponds generally to the spacing of the traces formed in the control lane on the record, or a spacing of one pitch. The teeth on successive laminations about the periphery of the scanning member are staggered with relation to one another so that all of the laminations in the scanning member generate what is in effect a helical screw whose pitch is equal to the spacing between the teeth on an individual lamination, or a pitch equal to the pitch of the traces. Thus, as the scanning members are rotated, the teeth of successive laminations will move across the traces on the control record in a direction related to the direction of rotation of the scanning member.

Since the successive laminations are separated by the non-magnetic material such as bronze, the magnetic circuit will be established once for each number of laminations disposed in the body of the scanning member. In the example shown, since there are 24 laminations, 24 interruptions of the magnetic flux will occur during one revolution of the scanning member. During one revolution of the scanning member, however, the teeth of the laminations or the threads of the screw generated by the laminations will have moved across the magnetic traces on the control record a distance equal to the pitch of the threads, or the distance between the teeth on any one lamination. This produces a high frequency signal modulated at the frequency corresponding to the rate of rotation of the scanning members. For example, if the scanning members are rotated at the rate of 60 revolutions per second, the high frequency signal generated will be equal to 24 times 60, or 1,440 cycles per second, which is modulated at 60 cycles per second. Figure 8 illustrates such a signal. The use of this form of scanning device produces a very good signal having a desirable signal to noise ratio.

In this species, the signal generated is displaced along a time axis proportional to displacement of the traces on the control record, as in the previous example. If, for example, the scanning members are rotated at the rate of 60 revolutions per second, and the traces on the record have a displacement of one trace during each second in one direction, for example, the direction of movement of the scanning members, the signal generated will, during that one second interval be displaced along a time axis, 360 electrical degrees. Conversely, if the scanning members are rotated at the same rate of speed, but the traces are displaced a distance equal to one trace during that second, but in the opposite direction, the signal will be displaced along a time axis in the opposite direction an amount equal to 360 electrical degrees.

In Figure 4, for example, the traces in the lateral control lane 88 are displaced towards the left. When the record is moved in the direction of the arrow shown in Figure 4, and if the scanning members move across the traces 90 to the left, it will be apparent that during movement of the record equivalent to the displacement of one trace, which may be assumed to be equal to the points 90a and 90b, the signal generated will go through a 360 degree phase shift. In the longitudinal control lane, the traces, as indicated at 91a, are generally parallel to the edge of the record or reference portion of the record, so that no change of the longitudinal signal is indicated. The portions of the traces at 91b indicate that the traces are displaced towards the left, as seen in Figure 4, prior to becoming parallel as at 91a. The traces indicated at 91b have a greater rate of displacement than those indicated at 90 indicating that the phase change of the signal per unit time or per length of the record was greater than that dictated by the displacement of the traces 90.

The division of the record into control lanes with a particular displacement of the traces at a particular point on the control record makes it possible to move the record at a wide range of speeds and still have the position of a member from instant to instant accurately controlled.

The signal shown in Figure 8 is rectified and forms a signal having the wave form shown in Figure 9. Whereas I have shown a signal generator adapted to generate a variable phase signal from a plurality of magnetic traces on a control record in Figures 4 thru 9, inclusive, I wish it to be understood that this particular form of scanning device or sensing device for the magnetic traces is shown and described in my co-pending application Serial No. 317,467, filed in the United States Patent Office on Oct.

29, 1952. Other signal generators having any one of the forms shown in that application may be employed to sense or scan the direction of movement of the magnetic traces with respect to the edge of the record and translate that displacement into a phase displacement of the primary signal generated.

Figure 10 illustrates a typical actuating mechanism which employs the principles of the system shown herein and described. In this figure, the member controlled is moved in a lateral and longitudinal direction by electric motors, whereas the form of the invention shown in Figures 1 thru 3, inclusive, shows a member controlled by hydraulic or fluid motors.

In Figure 10, 120 represents the bed of a machine tool such as a lathe. Longitudinally extending guideways 121 and 122 are formed on the bed or base 120 and are adapted to slidably support a carriage 123 which supports a tool or cutting member 124 in a turret or tool holder 125. 126 represents a work-holding chuck or equivalent member adapted to hold a piece of work. The member 126 may, if desired, be rotated. In this example of the system the tool 124 represents the member controlled.

The carriage 123 is provided with a pair of spaced, parallel, laterally extending guideways 127 and 128 upon which the turret 125 is slidably supported for movement in a lateral direction. Thus the movement of the tool or controlled member 124 may be resolved into lateral and longitudinal motions or coordinates of movement. For example, movement in the longitudinal direction may be taken to be representative of movement along a Y—Y coordinant, while movement in the lateral direction may be taken to be representative of movement along an X—X coordinant. A lead screw 129 is mounted on the bed of the lathe and extends generally parallel with the guideways 121 and 122. The lead screw may be threadably connected to the carriage 123 so that rotation of the lead screw 129 will advance and retract the carriage 123 along the guideways 121 and 122. A similar lead screw 130 extends generally transversely to the lead screw 129 and is carried by the carriage 123. Lead screw 130 may also be connected as by means of a conventional threaded nut or the like to the turret 125 so that rotation of the lead screw 130 will advance and retract the turret 125.

The screws 129 and 130 are each rotated by means of a differential mechanism, whose rate and direction of rotation are governed by the primary signal generated from the control record. 131 designates such a mechanism for rotating the lead screw 129 for moving the member 124 in longitudinal direction. 132 represents such a differential mechanism for moving the member 124 in lateral direction. The differential mechanisms include two power input shafts and an output shaft. The relative velocities of the input shafts governs the rate and direction of rotation of the output shaft. An alternating synchronous motor 133 is energized through a source of 60-cycle alternating current such as through leads 133a and 133b connected to mains 134 and 135. Motor 133 has its armature shaft connected to one power input shaft of the differential 131 and it may be assumed for purposes of example that motor 133 is operated at a speed of 1800 revolutions per minute. A direct current motor 136 has its armature shaft connected to the other power input shaft of the differential 131 and is controlled through suitable power leads 137 and 138 to a phase-comparing component 139, which is indicated diagrammatically in Figure 11. The speed of the direct current motor 136 may be taken as variable through a range of from 300 revolutions per minute to 3300 revolutions per minute. Motor 136 is controlled by means of the phase-comparing component 139.

Differential 132 also includes an alternating current motor 140, having its armature shaft connected to one power input shaft of the differential 132 energized through leads 141 and 142 connected to the 60-cycle alternating current mains 134 and 135. A direct current motor 143 has its armature shaft connected to the other power input shaft of the differential 132 and is energized by a suitable circuit or leads 144 and 145 leading to a phase comparing component 146 shown in Figure 11. The alternating current synchronous motor 140 is driven at a constant speed, for example, 1800 revolutions per minute and the direct current motor 143 has its speed controlled by the phase-comparing component 146. The arrangement of the differential mechanisms 131 and 132 is such that if the alternating current motor and direct current motor are operating at the same speed, that is, 1800 revolutions per minute, as in the example, the output shaft of the differential will remain in a static condition and accordingly the lead screws connected to the output shaft will be held in a stationary condition, resulting in a static condition of the controlled member 124. If, however, the direct current motor of either of the differentials is increased in speed by a given amount, say, for example, 300 revolutions per minute, or a total speed of 2100 revolutions per minute, the output shaft, and accordingly its associated lead screw, will be driven in one direction at the differential speed, or in this example, 300 revolutions per minute. Conversely, if the direct current motor has its speed reduced by a given amount say, for example, 300 revolutions per minute, the differential speed between the direct current motor and alternating current motor will be such as to produce a corresponding speed of the output shaft of the differential, for example, 300 revolutions per minute, but in the opposite direction. Thus, by controlling the speeds of the direct current motors, the controlled member may be moved in either longitudinal or lateral directions, or both, and in opposite directions at different rates of speeds depending upon the rate of rotation of the direct current motors.

A meter bar 146 similar to the meter bar 55 shown in Figure 1 is connected to the turret 125 and movably coextensively therewith. A meter bar 147 is similarly mounted on and carried by the carriage 123. A secondary signal generator designated generally at 148 is mounted on the carriage 123. A similar secondary signal generator 149 is mounted on the bed of the machine 122. Each of these generators is provided with a substantially light tight housing 148a and 149a and the associated meter bars 146 and 147 are mounted for sliding movement within these housings. Each generator includes a synchronous motor 150 and 151 which are in all material respects similar to the synchronous motor 59 illustrated in Figure 1. Each motor is energized through suitable leads connected to the 60-cycle alternating current source 134 and 135. Each generator is similar to the secondary signal generator 9, 55, 57, 60 and 65 shown in Figure 1 and Figure 2 in operation and includes the disc formed with the spiral light flux interrupting member and photo-cell for receiving the pulsating current. In Figure 10, 152 and 153 designate output leads from the photo-cell associated with the generator 148 and leads 154 and 155 lead from the photo-cell associated with the generator 149. The arrangement is such that when the turret 125 is moved through a predetermined distance, a predetermined phase shift or displacement of the signal along a time axis of the signal generated by the secondary signal generator 148 results. The displacement of the signal along a time axis may be in either direction, depending upon the direction of movement of the turret 125. Similarly, the secondary signal generated by the secondary signal generator 149 is shifted along a time axis a predetermined amount for predetermined movement of the carriage 123. In the particular embodiment shown, movement of the meter bars and their associated movable members, for example, the carriage and the turret, through a distance of .100 inch results in a 360 degree phase displacement or shift to the signal along a time axis. The secondary signal generated by the generator 148 is led to an amplifier 156 through the leads 152 and 153 in Figure 11. The secondary signal generated by the generator 149 is similarly led to an amplifier 157 through leads 154 and 155, as will be seen best in Figure 11.

After amplification, the primary signal and secondary signal for the control of the member in the lateral direction is led to a phase-comparing component 146. Similarly, the primary signal and secondary signal for the longitudinal direction of movement of the controlled member are led to the phase-comparing component 139.

Figure 12:
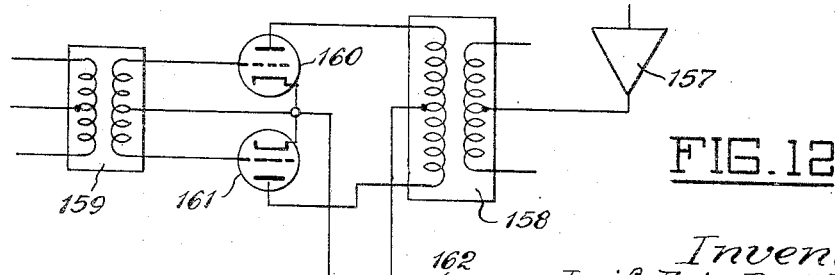
Figure 12 is a diagrammatic showing of a phase comparing component utilized in the system.

Figure 12 represents a diagrammatic showing of a typical phase-comparing component such as that indicated in block diagram at 139 in Figure 11. The phase-comparing components 139 and 146 will be taken to be identical for purposes of description. In Figure 12 the amplified signal from the amplifier 99 is led to a phase-splitting transformer 158. The secondary signal from the secondary signal generator 149 is led to a similar phase-splitting transformer as at 159 from the amplifier 157 shown in Figure 11. The primary signal from the record is supplied to the plates of two thyratron tubes designated generally at 160 and 161. The secondary signal is supplied from the transformer 159 to the grids of the thyratrons. The anodes of both thyratrons are connected to a direct-current amplifier 162. As is well known to the art, the amount of direct current passed by a thyratron tube may be controlled by varying the time of firing of the tube and by adjusting the phase relationship of the voltages impressed upon the plates and grids of the tubes, the amount of current passed by the tubes may be controlled. The thyratrons are so adjusted that when the secondary signal has a predetermined phase relation to the primary signal, sufficient direct current (which preferably is amplified) is supplied to the direct current motor (143 or 136) to rotate these motors at the same speed of rotation as the associated alternating current motors (133 or 140). Then as the primary signal is shifted along a time axis a predetermined number of degrees and in a predetermined direction say, for example, 10 electrical degrees the tubes will conduct for a proportionally greater part of their cycle, resulting in a larger supply of direct current to the amplifier 162 and to the direct current motor (136 or 143). This increase in current supplied to the motor causes rotation of the lead screw associated with the differential of the particular motor and causes the secondary signal, as governed by the meter bar, and secondary signal generator to be advanced along a time axis in the same direction until a state of balance is reached. Conversely, when the primary signal is displaced along a time axis in the opposite direction for a predetermined number of degrees, the tubes will conduct for a proportionately smaller period of time and reduce the amount of direct current supplied to the amplifier 162 and direct current motor. Smaller amount of currents supplied to the motor results in an attendant decrease in speed of the motor and rotation of the lead screw in the opposite direction so that the secondary signal is displaced along a time axis towards the primary signal until a state of balance is achieved. In the particular arrangement shown, the system operates from 180 electrical degrees out of phase for a corresponding zero direct current output to 90 degrees out of phase for maximum direct current output. In this manner, the phase differential between the primary and secondary signals is employed to control the rate and direction of movement of the controlled member.

Whereas I have shown and described certain numerical quantities such as rates of rotation of the alternating current and direct current motors and certain degrees of phase displacement related to physical displacement of the controlled member, I wish it to be understood that these quantities are by way of example only and are not to be taken in any limiting sense. I also wish it to be understood that whereas I show and describe a differential mechanism for moving the controlled member in lateral and longitudinal directions, this showing is merely representative of a typical system. In place of the differential mechanism shown in Figure 11, a reversible torque motor such as that shown in Figure 1 may be employed to drive the lead screws and controlled member in a rate and direction related to the direction of desired movement as dictated by the generally parallel traces on the control record and the phase displacement of the primary signal.

In all forms of the invention shown herein and described, the record having the parallel traces thereon may be moved at any desired speed. The position of the controlled member such as the work table 1 of Figure 1, or the tool 124 of Figure 10 is governed by the actual displacement from instant to instant of the traces with respect to the edge of the record. The desired position of the controlled member is indicated by the actual displacement of the traces from instant to instant, or in terms of an electrical degree phase displacement. As long as the signal generators are driven at the same speed, the portions of the traces immediately beneath the sensing devices will dictate the position of the controlled member. Whereas I have shown and described the sensing devices as being rotated at the same speed, it will be apparent that they may be driven at different speed ratios, for example, 2 to 1, or 3 to 1. If they are driven at different speed ratios, the spacing of the traces and the spacing of the apertures in the meter bar would be at that same ratio in order that the desired phase change as effected by the displacement of the traces produces a corresponding phase change for the actual movement of the member controlled.

While all of the traces formed on the control record are shown as being generally continuous throughout their length, I wish it to be understood that if desired each trace may be discontinuous throughout its length. If the individual traces are discontinuous or interrupted throughout their length, the result produced would be the same. The actual displacement of the trace produces a corresponding phase shift of the signal generated.

I have found that a signal generator of the form shown generally at 40 and 25 of Figure 1 and at 85 and 87 of Figure 4 may be employed to controllably vary the magnitude of the frequency of a cyclicly varying signal. When employing the generator as a system for varying the frequency of such a signal, I employ a record such as shown at 25 of Figure 1 or at 87 of Figure 4. The record is formed with a plurality of generally parallel traces impressed thereon throughout its length in a manner similar to that shown in Figures 3 and 4. A sensing assembly such as that shown in Figure 1 or Figure 4 is disposed closely adjacent to the record and is adapted to have alternate flux transmissive and non-flux-transmissive areas continuously move across the traces so as to vary the passage of flux between the record and sensing assembly in a cyclic manner. For example, if light flux such as is shown in Figure 1 is employed, the opaque spiral shown in Figure 3 will be employed to constantly move across the traces and thus vary the flux passing from the traces. If magnetic flux is employed, the helical screw shown as formed of the plurality of peripherally disposed laminations in Figures 5, 6 and 7 may be employed to constantly scan or move across the traces.

If light flux is employed, a photo-cell such as that shown at 51 in Figure 1 will be employed to transmit the variations in flux to a load circuit which may be taken as the amplifier 52 in Figure 1. If magnetic flux is employed, an induction coil such as shown at 92 of Figure 7 will be employed to transmit the cyclic signal to a load circuit, such as is shown by the amplifier 96 of Figure 7.

If the traces on the control record are generally parallel to the direction of movement or edge of the record the signal transmitted will have a frequency corresponding to the rate of advance of the flux transmissive portions of the scanning device across the traces. If it is assumed that the sensing devices such as shown at 40 or 85 in Figures 1 and 4, respectively, are rotated at the rate of 60 revolutions per second, the signal transmitted will have a frequency of 60 cycles per second. According to the invention, this frequency is controlled by producing additional relative movement between the traces and flux transmissive portions of the sensing device. This relative movement may be effected by shifting the traces with respect to the direction of movement of the flux transmissive areas on the sensing device. I prefer to hold the sensing device in a relatively fixed axial position while moving the record at a generally constant speed, for example, 10 inches per second. Then by imparting a slope or inclination to the traces on the record with respect to the edge of the record or the direction of movement of the record I may controllably vary the frequency of the signal generated. The amount of the slope or inclination will govern the frequency generated. For example, assume that the record shown at 87 in Figure 4 is driven in the direction of the arrow at a rate of 10 inches per second. Assume further that the traces 88 are displaced toward the left at the rate of one trace for 10 inches of record length, or one trace per second. If the flux transmissive areas or members on the sensing device move across the record to the left, as shown in Figure 4, the number of flux interruptions per second will be less, or 60 minus 1, resulting in a 59 cycle per second signal. Conversely, if the traces are given a slope in the opposite direction at the same rate, the result will be additive, or 60 plus 1, or 61 cycles per second.

By varying the slope of these traces at predetermined points in the length of the record, the signal will be selectively varied, as governed by the slope of the traces at various points on the record. By increasing or decreasing the slope from the given examples, the frequency of the signal generated may be correspondingly increased or decreased. Thus, with the use of a control record prepared in accordance with the principles of the invention, and a sensing assembly, it is possible to obtain a wide range of extremely accurate signal frequencies. A desired cycle of control frequencies may be stored on a strip of control record for use with any mechanism or system requiring the use of different frequencies from instant to instant in a control cycle. It will be apparent that different frequencies also may be obtained by varying the speed of the sensing members.

The use of the record and sensing assembly as a variable frequency generator requires constant control of the relative movement between the traces and flux-transmissive areas of the sensing assembly for any given frequency while the use of the record and sensing assembly as a primary signal generator in the control system herein shown and desired requires no such constant control of the relative movement. The use of the assembly for controlling a movable member permits the record to be stopped at any point and dictates the position of the member being controlled. When using the system for the control of a member, the actual displacement of the traces with respect to the reference edge of the record dictates the position of the member controlled, whereas if the signal generator is employed to controllably vary the frequency of a cyclic signal, the rate of displacement of the traces or the displacement of the traces per unit time with respect to the edge of the record governs the frequency generated.

If the record is stopped in the operation of the machine tool control system, the relative phase displacement of the signal dictates the position of the member controlled. If the record is stopped in the variable frequency system, the signal instantly reverts to the frequency established by the speed of scanning of the sensing devices, or 60 cycles per second, as in the given example.

I have found that the basic principles of the invention may also be employed in connection with a process control wherein it is desired to control the magnitude of a physical quantity, such as voltage, temperature, rate of flow, pressure and the like.

In such a system, it is oftentimes desirable to control the magnitude of the physical quantity for a long period of time with different magnitudes of the quantity desired during that time. When using the principles of the invention for controlling the magnitude of a physical quantity, the length of the control cycle during which successive magnitudes of the quantity are desired, is established by the length of the control record and the speed of movement of the control record. A control record may be formed as in the previous example with a plurality of generally parallel traces on the control record, with a group of traces provided for a particular control lane. In this example, one control lane is provided for each physical quantity controlled. Thus, on a single record, a plurality of control lanes may be provided to separately control several physical quantities, such as temperature, speed of flow, or pressure of a system. Each control lane may be provided with a primary signal generator which may be of the form illustrated in Figure 1 if the traces are light-transmissive, or of the form shown in Figures 4 thru 10, inclusive, if the traces on the control record transmit magnetic flux.

The traces are displaced with respect to the direction of movement or edge of the record by amounts related to selected or desired magnitudes of the physical quantity being controlled. A cyclic signal is generated from the traces and the signal is displaced along a time axis a predetermined number of electrical degrees for a predetermined desired magnitude. A secondary signal generator similar to the one shown in Figures 1, 2 and 3, is employed to produce a phase change of a secondary signal related to the actual change of magnitude of the variable. A phase comparing component similar to those shown and described in conjunction with Figure 1 thru 11, inclusive, is employed to continuously compare the phase relationships of these signals and supply an output signal for controlling a power element adapted to change the magnitude of the variable, in proportion and relation to the phase relations of the primary and secondary signals.

The power element in the case of temperature control may take the form of a valve for variably controlling the amount of fuel delivered to a heating means; it may take the form of a motor for driving a fan or pump for increasing the pressure or rate of flow in case of pressure control, or it may take the form of a motor for controlling the speed of rotation of a generator supplying voltage to a power line.

As an illustrative embodiment of the foregoing, assume that the voltage supplied to a line from a generator is desired to be controlled. A generally elongated record having a control lane thereon provided with a series of parallel traces dividing the control lane into alternate light-transmissive and non-light-transmissive areas is adapted to control the voltage. A signal generator, including a continuously rotated disc having a series of alternate light-transmissive and non-light-transmissive areas thereon, as defined by an Archimedes spiral such as shown in Figure 3 is disposed adjacent the record. A light source is positioned on one side of the record and is adapted to transmit light through the light-transmissive portions of the record and light-transmissive portions of the disc to a photo-cell which delivers pulsating current, as governed by the interruptions in the light transmitted, to an amplifier. The traces of the control record are displaced with respect to the edge of the record or the direction of movement of the record in amounts related to a desired voltage. Each trace may be continuous throughout its length on the control record or may be discontinuous. As the record is moved throughout its length, a phase displacement of the signal generated from the record and disc related in amount to the displacement of the traces and to the desired change in voltage occurs.

A variable speed motor is employed to drive the generator in a manner such that the voltage put out by the generator is proportional to the speed of the motor. A conventional volt meter is provided in the output lines from the generator and has a movable member which may be an indicating dial representative of the actual voltage put out. For every different voltage put out, the movable member assumes a different position in its range of movement.

A secondary signal generator generates a cycling signal which is adapted to have a phase change proportional to an actual change in the voltage produced. The secondary signal generator includes a meter bar suitably connected to the movable member of the volt meter so that for every different position of the movable member a different position of the meter bar results. The meter bar is provided with a series of spaced light-transmissive apertures and the areas between these apertures are non-light-transmissive in a manner similar to Figure 2. A continuously rotated disc member is provided with an opaque Archimedes spiral generated about its axis of rotation in a manner such as to divide the disc member into a series of alternate light-transmissive and non-light-transmissive areas spaced generally in accordance with the spacing of the apertures in the meter bar. A light source is positioned on one side of the meter bar and disc member and is adapted to project light through the light-transmissive areas or apertures in the meter bar and disc member and a photo-cell is positioned on the other side and is adapted to receive the light transmitted. As the disc is rotated in a continuous manner, which is related to the speed of rotation of the primary signal disc member, the light flux transmitted will vary in a cyclic manner and will produce a cyclic output signal from the photo-cell. This photo-cell is led to any suitable amplifier. As an actual change in voltage from the generator occurs, the meter bar will be moved through a distance representative of the actual change in voltage and the secondary signal generated will be displaced along a time axis in an amount proportional to this amount of movement and this change in voltage.

After amplification, the primary signal and secondary signal are led to a phase-comparing component which is similar to those described in connection with the previous embodiments. The arrangement is such as to produce an output signal proportional to the phase-relations of the primary signal and secondary signal. The output signal is led to the control windings of the motor which drives the generator.

A change in the displacement of the traces on the control record provides a corresponding phase change of the primary signal. This phase change results in a phase differential between the primary signal and secondary signal so that the speed of the motor will be regulated to change the voltage put out by the generator to a point where the primary signal and secondary signal are approximately in phase.

In place of the primary signal generator described in connection with this embodiment, a primary signal generator similar to that shown in Figures 4 thru 11 may be employed wherein the magnetic flux from the parallel traces of the control record governs generation of the primary signal. In lieu of using a meter bar and rotatable disc as part of the secondary signal generator, it is sometimes advantageous to employ a secondary signal generator which includes two discs having Archimedes spirals thereon dividing the discs into alternate light-transmissive and non-light-transmissive areas. In this example, the discs are co-axially arranged and one disc is rotated at a constant or continuous speed. The other disc is connected to the movable member of the volt meter so that movement of the member would rotate this disc. Light is transmitted through a relatively narrow slot or area of the disc and disposed on a radial line of the disc and is received by a photo-cell in a manner such that the light reaching the photo-cell is interrupted in a cyclic manner and movement of the movable member produces additional relative movement between the light-transmissive areas on the discs to produce a corresponding phase change of the secondary signal.

In some cases it may be found desirable to variably control the speed of the cycle by moving the record in selected increments. In this example it is advantageous to employ discontinuous traces in a manner similar to the traces shown in my copending application Serial Number 317,467, filed on Oct. 29, 1952. The traces are divided into groups arranged longitudinally of the record in each control lane. Each group may be displaced a different amount related to a different magnitude of the physical quantity and a different phase change of the signal generated. Thus when a different magnitude is desired the record is moved an amount such as to present the group of traces having the desired displacement in a position to be sensed by the sensing assembly.

Under some circumstances the record or control member which controls the generation of the primary signal may bodily shift in a direction transverse to its movement, due to slight play in the body of the record or in the bearings of the reels for storing and driving the record. A shift of the record transversely to its length produces a proportionate amount of additional relative movement between the traces on the record and the sensing members moving across the record, all of which results in a proportionate error in the desired phase displacement or phase shift of the primary signal.

In order to correct this difference I employ another control lane on the record. This control lane, which is precisely parallel to the other control lanes on the record has a series of parallel traces or a single trace extending throughout the length of the control lane. These traces are not displaced with respect to an edge or to the direction of movement of the record, but are maintained parallel to the control lanes.

Another signal generating assembly including a plurality of sensing members similar to those previously described is positioned adjacent to this control lane in a manner so as to generate a cyclic correction signal from this control lane. This cyclic signal is supplied to the control windings of the motor of the secondary signal generator. Alternating current motors whose speed is a function of the frequency and phase from instant to instant supplied to the motor are well known and further description of this type of motor is believed unnecessary. The arrangement is such that as long as the record maintains a true direction of movement the correction signal impressed upon the control windings of this motor has a constant frequency and has no effect upon the generation of the secondary signal and the phase displacement of the secondary signal.

However, if the record shifts in a direction transversely to its direction of movement, in either direction, additional relative movement is effected between the traces and the sensing members, which produces a corresponding phase displacement of the correction signal. Displacement of this correction signal along a time axis in either direction will rotate the rotor of the secondary signal motor through an angle and in a direction proportional to the degree and direction of transverse displacement of the record to correspondingly shift the phase of the secondary signal along a time axis. From the foregoing it will be apparent that as transverse movement of the record out of its predetermined path occurs which will of course produce an undesired phase displacement of the primary signal, a corresponding phase change of the secondary signal occurs so that errors induced in the system as a result of this shift of the record will be corrected and undesired movement of the member being controlled is avoided.

Undesired shifting of the record may occur during either the recording state of the system as described in my copending application Serial Number 336,768, filed on February 13, 1953, or in the playback stage of the system. The correction or reference signal traces are impressed upon the control record during the recording stage in a manner such that these traces are always precisely parallel to the control lane or lanes for the displaced traces.

The sensing members for the correction signal traces are preferably carried by the rotor shaft of the sensing members for the displaced traces.

Thus, by employing this correction or reference trace it is not necessary to maintain the control lanes precisely parallel to the edge of the record during the recording stage and in addition, undesired relative movement of the record and the sensing members becomes unimportant.

The use and operation of the systems herein disclosed are as follows:

I employ a control record for controlling the position from instant to instant of any movable member. The movable member may appropriately be any machine tool element which has a defined path in performing and effecting working operations. A first signal, which may appropriately be called a primary signal, is generated from this control record. The signal generated from the control record is shifted along a time axis from instant to instant in a direction and magnitude related to the direction and magnitude of desired movement of the working member. A secondary signal is generated by the member being moved, as by means of the disc 57 and meter bar 55 shown in Figures 1 and 2. This secondary signal is displaced along a time axis in a direction and magnitude related to the actual movement of the member being controlled. For every different desired position of the member being controlled, a different displacement of the primary signal along a time axis results.

The primary signal and the secondary signal are continuously compared so as to establish a phase relationship between the two signals. In use the secondary signal tends to lag behind the primary signal during instants of acceleration. Conversely a leading phase displacement is generally encountered during instants of deceleration. By comparing the timed relationship of these signals, it is possible to establish a phase differential between the two signals. In the apparatus herein shown and described, the timed relationship of the primary signal with the secondary signal is continuously compared as by means of the phase comparing component 70 in Figure 1 or the phase comparing components 139 and 146 shown in Figures 10, 11 and 12.

The phase differential existing between the two signals is led to a suitable mechanism for moving the controlled member. Thus, as the primary signal is displaced along its time axis, a phase differential between the primary signal and secondary signal results and this phase differential is utilized to actuate or move the controlled member. As the controlled member moves, the secondary signal is displaced along its time axis in a manner tending to minimize the phase differential between the two signals. From the foregoing it will be seen that, as the primary signal is displaced along its time axis, the secondary signal will tend to follow or track the primary signal. Stated in another way, the controlled member which generates the secondary signal tends to follow the displacement of the primary signal since movement of the controlled member displaces the secondary signal and the movement of the controlled member is dependent upon the phase differential between the primary signal and the secondary signal.

If the primary signal is being shifted along a time axis at a certain rate, the controlled member will move at that same rate, since the rate of phase change of the primary signal tends to cause a phase differential between the primary signal and the secondary signal of a magnitude corresponding to that rate. The magnitude of the phase differential establishes the rate of phase change of the secondary signal. This feature is highly advantageous when controlling the movement of the controlled member through a spatial path which can be defined in 2 or 3 coordinates. For example, if the control record 25 or 87 is provided with a plurality of channels or control lanes, one channel for each coordinate, it will be apparent that at any given point on the control record the controlled member may be moving in a certain rate and direction along one coordinate of movement while moving at a different rate and direction along another coordinate.

An advantageous feature of the invention resides in displacing plural traces on a control record at a rate and in a direction related to the rate and direction of desired movement of the controlled member. The use of plural traces in this manner makes for facile recording of desired movement; that is to say, the displacement of the traces from instant to instant is a precise index of the desired displacement of the working member from instant to instant. The displacement of the traces from instant to instant creates a resulting phase displacement of the primary signal generated by the scanning devices 40, 86 or 87.

The use of the plurality of traces enables an averaging of the displacement of the traces. This is highly advantageous because, even though the traces are all parallel, a slight departure from the predetermined displacement of one of the traces will be "balanced" or minimized because the signal generated results from the scanning and sensing of the plurality of traces. In addition, the plurality of traces permits unlimited movement of the controlled member in any direction with a very small width of record. Whenever a single trace is displaced far enough to intersect an edge of the control lane, another trace having the same rate of displacement appears on the control record at the opposite side of the control lane in position to be "sensed." In other words, the degree of movement of the controlled member is independent of the width of the record.

In use, the plurality of parallel traces on the control record are displaced with respect to a starting point or reference point by amounts and in directions related to the amount and direction of movement of the controlled member during a given period of time. The actual displacement of the traces at any point is representative of the change of position of the controlled member between the starting point and the particular point on the record. When more than one coordinate of movement is desired, a plurality of control lanes are provided. The speed of the play-back cycle is dependent upon the speed at which the record is moved. At any speed, the position of the record with respect to the sensing devices dictates the actual position of the controlled member. The signal generators each generate a cyclic signal which results from relative movement between the sensing devices and the flux-transmissive members on the control record or meter bar.

In all forms of the invention the flux, which may be light flux, as shown in Fig. 1, or magnetic flux, as shown in Fig. 4, is cyclically varied to produce the cyclic signals. Relative movement between the flux-transmissive members on the record and on the meter bar and the sensing members is effected both by the constant movement of the sensing members and by the intermittent but gradual movement of the flux-transmissive members. The sensing members continuously move across the flux-transmissive members. No particular rate of rotation or speed of these sensing members is necessary as long as they both operate at the same identical speeds or proportional speeds as required by the spacing of the flux-transmissive apertures on the meter bar. The sensing members may be jointly rotated by means of an air motor or by any other prime mover which does not necessarily operate at a constant speed. The phase relations of the primary signal and the secondary signal are dependent only upon the displacement of the traces on the control record and the displacement of the meter bar. The system or systems shown herein and described are "position-sensitive," that is to say, the record may be stopped at any point in its cycle, if desired, and the controlled member will be held in the position dictated by the displacement of the traces at the point on the record adjacent the sensing member.

Since the record may be moved at various speeds to control the speed of the cycle or various portions thereof, the system may be advantageously employed where it is desired to reduce or increase the speed of operations in response to various conditions met in the cycle such as a varying resistance in work being formed and the like. The cycle of operations is dependent only on the displacement of the signal and the displacement of the traces from instant to instant.

Since the record may be stopped without loss of the primary signal, it is advantageous to employ the principles of the invention with a process control wherein some physical quantity, such as voltage, pressure temperature, or the like, is desired to be accurately controlled. The displacement of the traces dictate the magnitude of the physical quantity. The traces may be interrupted throughout their individual lengths so as to present groups of traces with varying displacements. The process may be controlled by moving the record at a constant rate or may be controlled by moving the record in incremental steps so as to effect a desired change in the physical quantity controlled. In use, a plurality of machines may be controlled from the same record by employing a sensing assembly for each machine or by actuating a plurality of controlling mechanisms in response to a single differential signal.

Where in this specification I employ the terms "phase change," I wish this to be understood as the change in electrical degrees along a time axis. For example, if the signal is an alternating signal and the signal is plotted on a graph having a time axis and an amplitude axis, the signal will cross the time axis 120 times during the duration of one second. If the frequency of this signal is changed to 60.5 cycles per second, the starting point of the signal (which may be the point in the curve of the signal where the signal crosses the time axis on the start of the positive half-cycle) will be displaced along the time axis by 180 degrees and at the end of the duration of one second the signal will be crossing the time axis and starting the negative half-cycle. This change in the starting point of the signal is representative of the phase change or shift of the signal along the time axis, as the terms are employed in this specification. No particular frequency is necessary in the system. The frequencies of the primary signal generator and the secondary signal generator may constantly change and so long as they both change by the same amounts at the same instants, the controlled member is unaffected. The term "phase differential," as employed in this specification, is meant to be that difference in electrical degrees between correlative points of the primary signal and secondary signal which may, for example, be the points on both of these signals when each crosses the time axis on the start of the positive half-cycle. I wish it to be understood that where in this example I have referred to an alternating current signal, this signal is used only as representative of a cyclic signal.

Whereas I have described and shown operative forms of my invention, I wish it to be understood that this showing is to be taken in an illustrative or diagrammatic sense only. There are many modifications of the invention that will be apparent to those skilled in the art and still fall within the scope and spirit of the invention. For example, whereas I show a control record in the form of a generally thin and flat strip of film, this form of record is not critical. The record may have other shapes and configurations, such as a circular disc or the like. Essentially, the system includes the use of a record having control lanes thereon provided with indicia representative of controlled movements. Also, where I show the secondary signal generator as including a meter bar and scanning disc, other forms of signal generators which displace a signal along a time axis at a rate and in a direction related to the rate and direction of actual movement of the member may be employed. For example, a phase shifting transformer, including a pair of relatively movable cores with one core supplied with a current of the same frequency as the frequency supplied to the primary signal generator motor, may be employed. I wish the invention, therefore, to be restricted in scope only by the scope of the hereinafter appended claims.

I claim:

1. The method of controlling a movable member including the steps of: generating a variable phase signal from a control record, changing the phase of said signal proportional to the magnitude and direction of desired movement of the member along a predetermined coordinate of movement, generating a second variable phase signal, changing the phase of said second signal proportional to the magnitude and direction of actual movement of said member, exclusively comparing the timed relationship of the signals, and moving the member in a direction and magnitude in accordance with the comparison derived.

2. The method of controlling a movable member including the steps of: generating a plurality of signals, there being one signal for each coordinate of desired movement of a member controlled, changing the phase of each signal in proportion to the amount and to the direction of movement of the member along the respective coordinate, providing another signal for each coordinate and changing its phase in a direction and amount related to the direction and amount of desired movement of the member along the respective coordinate, and moving the member in a direction and amount related to the direct phase relationship of the signals for each coordinate.

3. The method of controlling a movable member from a control record provided with a trace representing a controlled movement, including the steps of: displacing the trace with respect to the direction of movement of the record in a direction related to the direction of desired movement of the member, generating an electrical signal, changing the phase of said signal in a direction related to the direction of displacement of the trace, and moving the member in accordance with the direction of phase change of the signal.

4. The method of controlling a movable member including the steps of: providing a control record with a trace representing a controlled movement, displacing the trace with respect to the direction of movement of the record at a rate and in a direction related to the rate and direction of desired movement of the member, generating an electrical signal, changing the phase of said signal at a rate and in a direction related to the direction and rate of displacement of the trace, and moving the member in accordance with the rate and direction of phase change of the signal.

5. The method of controlling a movable member including the steps of: providing a control record with a trace representing a controlled movement, displacing the trace with respect to the direction of movement of the record at a rate and in a direction related to the rate and direction of desired movement of the member, said trace, if displaced a predetermined amount, intersecting an edge of the record with another trace appearing on the record and having the same direction and rate of displacement as the edge intersecting trace, generating an electrical signal, changing the phase of said signal at a rate and in a direction related to the direction and rate of displacement of the traces, and moving the member in accordance with the rate and direction of phase change of the signal.

6. The method of controlling a movable member including the steps of: providing a control record with a plurality of traces representing controlled movements, displacing the traces with respect to the direction of movement of the record in a direction related to the direction of desired movement of the movable member, generating a variable phase signal from the traces, varying the phase of said signal proportional to the displacement of the traces, and moving the member in accordance with the phase displacement of said signal.

7. The method of controlling a movable member including the steps of: providing a control record with a plurality of traces representing controlled movements, displacing the traces with respect to a reference portion of the record in a direction related to the direction of desired movement of the movable member, generating a variable phase signal from the traces, varying the phase of said signal proportional to the displacement of the traces, and moving the member in accordance with the phase displacement of said signal.

8. The method of controlling a movable member including the steps of: providing a control record with a plurality of traces representing controlled movements, displacing the traces with respect to the direction of movement of the record in a rate and direction related to the rate and direction of desired movement of the movable member, generating a variable phase signal from the traces, varying the phase of said signal proportional to the rate and direction of displacement of the traces, and moving the member in accordance with the phase displacement of said signal.

9. The method of controlling a movable member including the steps of: providing a control record with a plurality of traces representing controlled movements, displacing the traces with respect to the direction of movement of the record in a direction related to the direction of desired movement of the movable member, generating an electrical signal from the traces, varying the phase of said signal proportional to the displacement of the traces, and moving the member in accordance with the phase displacement of said signal.

10. The method of controlling a movable member including the steps of: providing a control record with a plurality of traces representing controlled movements, displacing the traces with respect to the direction of movement of the record in a direction related to the direction of desired movement of the movable member, generating a variable phase signal from the traces, changing the phase of said signal in a direction related to the direction of displacement of the traces, and moving the member in accordance with the phase change of said signal.

11. The method of controlling a movable member including the steps of: providing a control record with a plurality of traces representing controlled movements, displacing the traces with respect to the direction of movement of the record in a direction related to the direction of desired movement of the member, changing the phase of a first signal proportional to the displacement of the traces, changing the phase of a second signal proportional to the movement of the member, establishing a phase differential between the signals, and moving the member in accordance with the phase differential derived.

12. The method of controlling a movable member including the steps of: providing a control record with a plurality of traces representing controlled movements, displacing the traces with respect to the direction of movement of the record at a rate and in a direction related to the rate and direction of desired movement of the member, changing the phase of a primary signal proportional to the rate and direction of displacement of the traces, changing the phase of a secondary signal proportional to the rate and direction of actual movement of the member, establishing a phase relationship of the signals, and moving the member in accordance with the phase relationship derived.

13. The method of controlling a movable member including the steps of: providing a control record with a plurality of control lanes, there being one control lane for each coordinate of movement of a member, providing each control lane with a plurality of traces representing controlled movements along the respective coordinate, displacing the traces in each lane in a direction related to the direction of desired movement of the member along the respective coordinate, changing the phase of a primary signal for each lane proportional to the displacement of the traces, and actuating a controlling mechanism for the member in response to the signal displacement for each group of traces.

14. The method of controlling a movable member including the steps of: providing a control record with a plurality of traces representing controlled movements for each coordinate of movement of the member, displacing the traces with respect to the direction of movement of the record in a direction related to the direction of desired movement of the movable member along each coordinate, generating a variable phase signal from the traces for each coordinate, varying the phase of each signal proportional to the displacement of the traces for each coordinate, and moving the member in accordance with the phase displacement of the signals.

15. The method of controlling a movable member including the steps of: providing a control record with a plurality of groups of generally parallel traces representing controlled movements, displacing the traces of each group with respect to the direction of movement of the record at a rate and direction related to the rate and direction of desired movement of the movable member, generating a variable phase signal for each group of traces, varying the phase of each signal proportional to the rate and direction of displacement of its traces, and moving the member in accordance with the phase displacements of the signals.

16. The method of controlling a movable member including the steps of: providing a control record with a plurality of traces representing controlled movements, displacing the traces with respect to a reference portion of the record in a direction related to the direction of desired movement of the movable member, said traces if displaced a predetermined amount intersecting an edge of the record with another trace appearing on the record and having the same direction of displacement as the edge intersecting traces, generating a variable phase signal from the traces, varying the phase of said signal proportional to the displacement of the traces, and moving the member in accordance with the phase displacement of said signal.

17. A control member for use in control cycles including a relatively thin flat elongated member, said member having a plurality of generally parallel traces thereon representing controlled movements, said member having a defined edge, said traces having portions generally parallel to said edge and portions displaced with respect to said defined edge by an amount equal to a predetermined phase change of an electrical signal.

18. A control member for use in control cycles including a relatively thin flat elongated member, said member having a plurality of generally parallel traces thereon adapted to transmit magnetic flux, said member having a defined edge, said traces having portions generally parallel to said edge and portions displaced with respect to said defined edge by an amount equal to a predetermined phase change of an electrical signal.

19. A control member as recited in claim 17, wherein said traces are discontinuous throughout their length.

20. A control member as recited in claim 17, wherein said traces are displaced in a manner such that if extended far enough the traces intersect said defined edge.

21. A system for controlling a member movable through a spatial path which includes a primary signal generator adapted to generate a cyclic signal from a control record provided with a plurality of displaced traces thereon representing desired movements of the member, a secondary signal generator adapted to generate a signal whose phase is representative of actual movement of the member controlled, means for comparing the phase relationships of said signals, and a controlling mechanism for moving the member in a direction related to the comparison derived.

22. A system for controlling movement of a controlled member through a spatial path including a control record having a trace thereon displaced with respect to the edge of the record in a direction related to the direction of desired movement of the member, a sensing assembly positioned adjacent said record adapted to generate a signal having a phase displacement corresponding to displacement of said trace, a member adapted to move through a spatial path representative of actual movement of the member controlled, said member being provided with a plurality of spaced flux-transmissive areas, a sensing assembly for said member adapted to sense the direction and magnitude of movement of said member and to displace the phase of a second signal proportional to movement of said member, means for comparing the phase relationships of said signals, and an actuating mechanism for said controlled member operable in response to the phase relationship derived.

23. A system for controlling a member movable through a spatial path which includes a primary signal generator having a movable scanning member adapted to generate a phase variable signal from a control record provided with a plurality of displaced traces thereon representing desired movements of the member, a secondary signal generator adapted to generate a signal whose phase is representative of actual movement of the member controlled, means for comparing the phase relationships of said signals, and means for moving the member in a direction related to the comparison derived.

24. A system for controlling a member movable through a spatial path which includes a primary signal generator having a movable scanning member adapted to generate a cyclic signal from a control record having a plurality of traces thereon representing desired movements of the member, a secondary signal generator adapted to generate a signal whose phase is representative of actual movement of the member controlled, means for comparing the phase relationships of said signals, and means for moving the member in a direction related to the comparison derived.

25. A system for controlling a member movable through a spatial path which includes a primary signal generator adapted to generate a variable phase signal from a control record provided with a plurality of displaced traces thereon representing desired movements of the member, a secondary signal generator having a movable scanning member adapted to generate a signal whose phase is representative of actual movement of the member controlled, means for comparing the phase relationships of said signals, and means for moving the member in a direction related to the comparison derived.

26. A system for controlling a member movable through a spatial path which includes a primary signal generator having a rotatable scanning member adapted to generate a phase variable signal from a control record provided with a plurality of displaced traces thereon representing desired movements of the member, a secondary signal generator having a rotatable scanning member adapted to generate a signal whose phase is representative of actual movement of the member controlled, means for comparing the phase relationships of said signals, and means for moving the member in a direction related to the comparison derived.

27. A system for controlling a member movable through a spatial path which includes a primary signal generator having a movable scanning member adapted to generate a phase variable signal from a control record provided with a plurality of displaced traces thereon representing desired movements of the member, a secondary signal generator having a movable scanning member adapted to generate a signal whose phase is representative of actual movement of the member controlled, means for driving said scanning members at proportional speeds, means for comparing the phase relationships of said signals, and a controlling mechanism for moving the member in a direction related to the comparison derived.

28. A signal generating assembly including a record having traces thereon displaced with respect to a reference portion of said record in a manner related to a desired variance in a signal, a sensing assembly positioned adjacent to the record and including a plurality of scanning members adapted for movement transversely to said record, means for moving said record, means for moving said members continuously, said traces on said record having predetermined flux-transmissive qualities adapted for the passage of a predetermined amount of flux from said record, said members having predetermined flux-transmissive qualities whereby continuous movement of said members across said traces provides a periodic variance in the flux transmitted, and means for transmitting an electrical signal in response to said variations of flux.

29. A generator as recited in claim 28 wherein said traces and the areas between said traces are formed and adapted to transmit varying amounts of light flux.

30. The method of controlling the magnitude of a physical quantity comprising the steps of: generating a primary signal from a control record, generating a secondary signal, changing the phase of said primary signal in proportion to a desired magnitude of the quantity, changing the phase of said secondary signal proportional to the actual magnitude of said quantity, comparing the phase relations of said signals to obtain a phase differential and varying the magnitude of said quantity in response to the phase differential between said signals.

31. The method of controlling the magnitude of a physical quantity comprising the steps of: generating a primary signal from a trace on a control record for said quantity displacing the trace with respect to the direction of movement of the record proportional to a desired change in said quantity to produce a phase displacement of said signal, and changing the magnitude of said quantity in accordance with the displacement of said signal.

32. The method of controlling the magnitude of a physical quantity comprising the steps of: providing a control record with a plurality of generally parallel traces thereon representing the desired magnitudes of said quantity, generating a primary signal from said traces, displacing the traces with respect to the direction of movement of the record proportional to a desired change in said quantity to produce a phase displacement of said signal, and changing the magnitude of said quantity in accordance with the displacement of said signal.

33. The method of controlling the magnitude of a physical quantity comprising the steps of: providing a control record with a trace thereon representing the desired magnitudes of said quantity, generating a primary signal from said trace, displacing the trace with respect to the direction of movement of the record proportional to a desired change in said quantity to produce a phase displacement of said signal, generating a secondary signal, changing the phase of said secondary signal proportional to the actual change in magnitude of said quantity and changing the magnitude of said quantity in accordance with the differential displacement of said signals.

34. The method as recited in claim 33 wherein said trace is discontinuous throughout its length.

35. The method of generating a variable cyclic signal comprising the steps of continuously moving a control record with a flux-transmissive trace thereon, continuously moving a series of alternate flux-transmissive and nonflux transmissive members transversely to said trace for producing a cyclic signal, and producing continuous, additional, relative movement between said trace and said members proportional to a desired cyclic variance of the signal.

36. The method of generating a variable cyclic signal comprising the steps of continuously moving a control record with a plurality of generally parallel flux-transmissive traces thereon, continuously moving a series of members having differential flux-transmissive qualities transversely to said traces for producing a cyclic signal, and producing continuous, additional, relative movement between said traces and said members proportional to a desired cyclic variance of the signal.

37. The method of controlling a movable member which comprises the steps of generating a primary signal and changing the phase of the signal thus generated in amounts and directions related to desired movement of the member controlled, changing the phase of a secondary signal in an amount and direction related to the actual movement of the member controlled, moving the member in amounts and directions related to the phase relations of the signals, generating a correction signal, changing the phase of the correction signal in an amount and direction related to an erroneous displacement of said primary signal, and changing the phase displacement of the secondary signal in an amount and direction related to the displacement of the correction signal.

38. The method of controlling a movable member which comprises the steps of generating a primary signal from a control record, varying the primary signal in amounts related to the desired movement of a controlled member, moving the member in a direction related to the variance in the signal generated, generating a correction signal, varying the correction signal in amounts related to an undesired variance in the primary signal, and utilizing selected variations in the correction signal to prevent unintended movement of the member.

39. The method recited in claim 38 wherein the correction signal is generated from a trace extending generally parallel to the direction of movement of the record.

40. The method recited in claim 38 wherein the correction signal is generated from a trace extending generally parallel to a control lane on the record.

41. The method recited in claim 38 wherein a sensing assembly is positioned adjacent the record and is adapted to transmit a variance in the correction signal upon occurrence of undesired relative movement of the record and sensing assembly.

42. A system for controlling a machine tool including a record and a trace thereon, said trace being displaced with respect to an edge of the record as a function of desired movement of a controlled member of the machine tool, means for varying the phase of a cyclic signal as a function of the displacement of said trace, and means for moving said controlled member in response to phase variations in said signal.

43. In a method for controlling machine tools including the steps of generating a first signal, having predetermined characteristics, from indicia recorded on a control record, changing the characteristics of said signal in accordance with desired movements of a machine tool and in response to changes in said indicia, generating a second signal having characteristics similar to the characteristics of said first signal, changing the characteristics of said second signal in response to the actual movement of said machine tool, comparing the characteristics of said two signals and moving said machine tool in accordance with said comparison.

44. A method for controlling the direction of movement of machine tools including the steps of changing indicia on a control record in accordance with desired rates and directions of movement of the machine tool, comparing the rates and directions of actual movement of the machine tool with said desired rates and directions of movement, and moving said machine tool in accordance with the difference in rates and directions of movement prescribed by said indicia and that indicated by the actual movement of said machine tool.

45. The method of controlling a machine tool including the steps of moving a machine tool in response to the phase differential existing between at least two cyclic signals, and varying said phase differential in response to movement of said machine tool.

46. The method of controlling machine tools including the steps of moving a machine tool in response to the phase differential between a first cyclic signal generated from a control record and a second cyclic signal, and varying said phase differential in response to movement of said machine tool.

47. The method of controlling a machine tool including the steps of moving a machine tool in response to the phase differential between a cyclic signal generated from a control record and a second cyclic signal, cyclically varying said first signal in accordance with the desired direction of movement of said machine tool, and varying the phase difference between said signals in response to actual movement of said machine tool.

48. The method of controlling a member capable of movement through a spatial path which includes the steps of generating a control signal from a varied pattern representing displacement intelligence on a control record by sensing the pattern, and moving the controlled member in desired rates and directions as a function of the phase difference between the control signal and a signal generated independently of said record.

49. The method of controlling a member capable of movement through a spatial path which includes the steps of generating a control signal from a varied magnetic pattern on a control record with the signal generated having a predetermined base frequency, variations in said magnetic pattern being effective to vary the phase of the signal, generating a secondary signal independently of the record with the secondary signal having the same base frequency as that of the first signal, varying the phase of said secondary signal as a function of actual movement of the controlled member, and imparting movement to the controlled member as a function of the phase relation of the two signals.

50. The method of controlling the displacement of a member comprising providing an unrecorded base frequency signal, providing a signal storage member upon which varied flux transmissive impressions representing desired displacement indicia are recorded, sensing said varied flux transmissive impressions, imparting phase displacements to said base frequency signal responsive to said varied flux transmissive impressions sensed and controlling the displacement of said member in response to said phase displacements.

51. The method of controlling the movement of an element by displacement indicia recorded along the length of a tape-like storage member in the form of variations of a magnetic pattern, comprising providing a cyclic reference signal independently of said storage member and at a predetermined base frequency, displacing said member past a point, sensing said variation at said point, imparting a phase displacement to said cyclic signal proportional to said variations to provide a variable control signal and controlling the instantaneous rate, direction and magnitude of displacement of said element responsive to the magnitude and sign of the phase displacement between said reference signal and said control signal.

52. The method of controlling the displacement of a movable member comprising generating an unrecorded cyclic signal having a predetermined reference frequency, generating a control signal by sensing flux variations in a varied flux transmissive pattern representing displacement indicia on a storage member and having a frequency as a function of said cyclic signal, and having phase as a function of the sensed variations in the flux transmissive pattern, and imparting movement to the movable member as a function of the phase relations of said control signal and said cyclic signal.

53. The method of generating a variable frequency comprising the steps of continuously moving a control record having a plurality of generally parallel traces thereon, continuously scanning said traces at a predetermined rate to thereby generate a frequency corresponding to said rate, and producing a different frequency by causing movement of said traces in a direction parallel to the direction of scanning while the record is undergoing continuous movement.

54. The method of varying an error signal as a function of the difference in electrical characteristics between an information signal generated from a control record provided with indicia representative of changes in a variable and a second signal having variable electrical characteristics in common with the electrical characteristics of said first signal while representative of actual changes in the variable, including the steps of maintaining base values of said electrical characteristics equal to each other independently of movement of the record, varying the characteristic of the information signal in response to changes in indicia along the length of the control record, varying the characteristic of said second signal in response to actual changes in the characteristic, generating an error signal, and changing the error signal as a function of the difference in electrical characteristic of the two signals.

55. The method of varying an error signal as a function of the phase difference between a variable phase information signal generated from a control record provided with indicia representative of changes in a variable and a second variable phase signal representative of actual changes in the variable, including the steps of maintaining base frequencies of the signals equal to each other independently of movement of the record, varying the phase of the information signal in response to changes in indicia along the length of the control record, varying the phase of said second signal in response to actual changes in said variable, generating an error signal, and changing the error signal as a function of the phase difference in said signals.

56. The method of representing the position of an object from instant to instant with respect to a reference point including the steps of: generating an electrical signal, and changing the phase of said signal relative to a reference signal a predetermined, successive amount for each predetermined, successive, linear position of the object.

References Cited in the file of this patent

UNITED STATES PATENTS

| | | |
|---|---|---|
| 1,475,583 | Hoxie | Nov. 27, 1923 |
| 2,031,764 | Eremeeff | Feb. 25, 1936 |
| 2,213,108 | Pollard | Aug. 27, 1940 |
| 2,416,097 | Hansen | Feb. 18, 1947 |
| 2,420,509 | Whittaker | May 13, 1947 |
| 2,427,421 | Rieber | Sept. 16, 1947 |
| 2,432,123 | Potter | Dec. 9, 1947 |
| 2,434,057 | Sprowle | Jan. 26, 1948 |
| 2,437,140 | Waldie | Mar. 2, 1948 |
| 2,475,245 | Leaver | July 5, 1949 |
| 2,493,508 | Thynell | Jan. 3, 1950 |
| 2,508,451 | Dicke | May 23, 1950 |
| 2,537,770 | Livingston | Jan. 9, 1951 |
| 2,628,539 | Neergaard | Feb. 17, 1953 |
| 2,690,532 | Johnson | Sept. 28, 1954 |
| 2,698,410 | Madsen et al. | Dec. 28, 1954 |